United States Patent
Kumagai et al.

(10) Patent No.: US 9,222,387 B2
(45) Date of Patent: Dec. 29, 2015

(54) CONTROL APPARATUS FOR AN INTERNAL COMBUSTION ENGINE

(75) Inventors: Noriaki Kumagai, Susono (JP); Mamoru Yoshioka, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/373,216

(22) PCT Filed: Jan. 18, 2012

(86) PCT No.: PCT/JP2012/050953
§ 371 (c)(1),
(2), (4) Date: Jul. 18, 2014

(87) PCT Pub. No.: WO2013/108379
PCT Pub. Date: Jul. 25, 2013

(65) Prior Publication Data
US 2014/0352283 A1  Dec. 4, 2014

(51) Int. Cl.
*F01N 3/00* (2006.01)
*F01N 3/20* (2006.01)
*B60K 6/445* (2007.10)
(Continued)

(52) U.S. Cl.
CPC .............. *F01N 3/2013* (2013.01); *B60K 6/445* (2013.01); *B60W 10/06* (2013.01); *F01N 3/2026* (2013.01); *F01N 9/00* (2013.01); *B60Y 2300/474* (2013.01); *F01N 2590/11* (2013.01);
(Continued)

(58) Field of Classification Search
USPC ................... 60/275, 280, 284, 285, 286, 300; 180/65.2, 65.3, 65.4
See application file for complete search history.

(56) References Cited

U.S. PATENT DOCUMENTS 8,333,066 B2 * 12/2012 Hirose ............................ 60/300
8,499,547 B2 *  8/2013 Mitsutani ........................ 60/284
(Continued)

FOREIGN PATENT DOCUMENTS

JP       9 287433    11/1997
JP    2004 360526    12/2004
(Continued)

OTHER PUBLICATIONS

International Search Report Issued Apr. 17, 2012 in PCT/JP12/050953 Filed Jan. 18, 2012.

*Primary Examiner* — Binh Q Tran
(74) *Attorney, Agent, or Firm* — Oblon, McClelland, Maier & Neustadt, L.L.P.

(57) ABSTRACT

In a control apparatus for an internal combustion engine provided with an electrically heated catalyst which heats a catalyst having an ability to purify an exhaust gas by heat from a heat generation element which generates heat by the supply of electric power, provision is made for a decision unit that decides a restraint amount for energy inputted to the electrically heated catalyst through the exhaust gas so that a heat generation element internal temperature difference, which is a difference in temperature between predetermined portions in the heat generation element of the electrically heated catalyst at the time of cold starting of the internal combustion engine, falls within a predetermined temperature range; and a control unit that controls an operating state of the internal combustion engine according to the restraint amount for the input energy decided by the decision unit. With this construction, the occurrence of cracks inside the heat generation element of the electrically heated catalyst is suppressed.

7 Claims, 20 Drawing Sheets

(51) Int. Cl.
  *B60W 10/06* (2006.01)
  *F01N 9/00* (2006.01)

(52) U.S. Cl.
  CPC ............ *F01N 2900/08* (2013.01); *Y02T 10/26* (2013.01); *Y02T 10/47* (2013.01); *Y02T 10/6239* (2013.01)

(56) References Cited

U.S. PATENT DOCUMENTS

| | | | |
|---|---|---|---|
| 8,549,839 B2 * | 10/2013 | Barasa | 60/286 |
| 8,660,730 B2 * | 2/2014 | Hashimoto | 701/22 |
| 8,720,193 B2 * | 5/2014 | Gonze et al. | 60/303 |
| 8,826,643 B2 * | 9/2014 | Yoshioka et al. | 60/277 |
| 2006/0266020 A1 | 11/2006 | Okamoto et al. | |

FOREIGN PATENT DOCUMENTS

| | | |
|---|---|---|
| JP | 2005 140088 | 6/2005 |
| JP | 2007 2794 | 1/2007 |
| JP | 2009 189921 | 8/2009 |
| JP | 2010 116861 | 5/2010 |

* cited by examiner (a)

(b)

CONTROL APPARATUS FOR AN INTERNAL COMBUSTION ENGINE

TECHNICAL FIELD

The present invention relates to a control apparatus for an internal combustion engine.

BACKGROUND ART

In a filter which is arranged in an exhaust system of an internal combustion engine for trapping and removing particulate matter (PM) in an exhaust gas, it is generally intended to maintain the PM trapping ability of the filter by oxidizing and removing the PM trapped. Thus, when oxidation removal of the trapped PM is carried out in the filter, a rapid temperature gradient occurs in the filter due to the heat generated by the oxidation reaction, thus giving rise to a possibility that cracks and/or melting loss of the filter may be caused. Accordingly, as a technology to suppress the occurrence of cracks, etc., in the filter, there has been developed one described in Patent Document 1, for example. With this technology, in order to make small a temperature gradient in the filter at the time of PM oxidation, in a region in which a mean temperature of the filter is 100 degrees C.-700 degrees C., an oxidative condition of PM in the filter is regulated in such a manner that a rate of rise of the mean temperature in the filter becomes equal to or less than 100 degrees C./minute.

In addition, as shown in Patent Document 2, a sensor for detecting a desired parameter may be arranged in an exhaust system of an internal combustion engine, and a heater for heating the sensor may be arranged in combination therewith for the purpose of such as enhancing the detection accuracy of the sensor. In this case, when moisture has adhered to the sensor at the time the sensor is to be heated by the heater, a crack may occur in the sensor due to a difference in temperature between the sensor side thus heated and the moisture side. Accordingly, in Patent Document 2, there is disclosed a technology in which heating of the sensor by means of the heater is carried out in a gentle or gradual manner, so that a difference in temperature between the interior of the heater and the surface thereof does not exceed a predetermined value.

PRIOR ART DOCUMENTS

Patent Documents

Patent Document 1: Japanese patent laid-open publication No. H9-287433
Patent Document 2: Japanese patent laid-open publication No. 2004-360526

SUMMARY OF THE INVENTION

Problems to be Solved by the Invention

In order to purify an exhaust gas from an internal combustion engine in an effective manner, an electrically heated catalyst may be provided or arranged in an exhaust passage of the internal combustion engine. This electrically heated catalyst enables a catalyst having an exhaust gas purification ability to be quickly activated by heat from a heat generation element which generates the heat by the supply of electric power. The electrically heated catalyst is intended to perform exhaust gas purification, unlike the sensor arranged in the exhaust system which is shown in the prior art technology, and hence, it is constructed such that the exhaust gas from the internal combustion engine flows into the electrically heated catalyst. For that reason, the construction is such that a large amount of energy can be received from the inflowing exhaust gas, as a result of which there will be a fear that a difference in temperature leading to a crack may occur in the heat generation element of the electrically heated catalyst, resulting from the energy thus received.

In particular, at the time of cold starting of the internal combustion engine, the temperature of the electrically heated catalyst itself is in a relatively low temperature state, so the present inventors have found out that it is easy to generate a difference in temperature in the heat generation element leading to a crack. Accordingly, the necessity of appropriately controlling the heat energy received from the exhaust gas flowing into the electrically heated catalyst at the time of cold starting of the internal combustion engine is inferred, but in the prior art technology, investigation about the necessity has not been made to a sufficient extent.

The present invention has been made in view of the problems as mentioned above, and the object of the invention is to provide a control apparatus for an internal combustion engine which, in the internal combustion engine having an electrically heated catalyst, controls an operating state of the internal combustion engine in an appropriate manner so that a difference in temperature leading to a crack does not occur in a heat generation element which is electrically energized to generate heat in the electrically heated catalyst.

Means for Solving the Problems

In the present invention, in order to solve the aforementioned problems, an attention is focused on the relation between input energy to a catalyst through an exhaust gas, which is discharged from an internal combustion engine and produces a difference in temperature in a heat generation element of an electrically heated catalyst at the time of cold starting of the internal combustion engine, and an operating state of the internal combustion engine. As a result of this, it becomes possible to suppress the occurrence of a crack in the heat generation element at the time of cold starting of the internal combustion engine in an effective manner, based on the fact that the energy possessed by the exhaust gas, i.e., the energy supplied to the electrically heated catalyst, varies according to the operating state of the internal combustion engine.

Specifically, the present invention resides in a control apparatus for an internal combustion engine which is provided with: an electrically heated catalyst that is arranged in an exhaust passage of the internal combustion engine, and heats a catalyst having an ability to purify an exhaust gas with heat from a heat generation element which generates the heat by supply of electric power thereto; a decision unit that decides a restraint amount for energy inputted to said electrically heated catalyst through the exhaust gas so that a heat generation element internal temperature difference, which is a difference in temperature between predetermined portions in said heat generation element of said electrically heated catalyst at the time of cold starting of said internal combustion engine, falls within a predetermined temperature range; and a control unit that controls an operating state of said internal combustion engine according to the restraint amount for said input energy decided by said decision unit.

In the electrically heated catalyst provided for said internal combustion engine, the heat generation element is caused to generate heat by the supply of electric power (electrical energization) to the heat generation element, so that the heating of the catalyst having the exhaust gas purification ability is carried out by means of the heat. As an example thereof, there are mentioned a form of embodiment in which the catalyst is supported by a carrier acting as the heat generation element, another form of embodiment in which the heat generation element is arranged at the upstream side of the catalyst so that the generation of heat is conducted to the catalyst, etc. Then, in the control apparatus for an internal combustion engine according to the present invention, the restraint amount for the energy inputted to the electrically heated catalyst (hereinafter referred to as "input energy") through the exhaust gas, which is discharged from the internal combustion engine and flows into the electrically heated catalyst, is decided by the decision unit, in order to suppress the occurrence of a crack in the heat generation element of the electrically heated catalyst. Specifically, in the electrically heated catalyst, based on the fact that when the heat generation element internal temperature difference with respect to the heat generation element becomes large too much, a crack can occur in the heat generation element, the restraint amount for the input energy through the exhaust gas from the internal combustion engine is decided by the decision unit, in such a manner that the heat generation element internal temperature difference falls within the predetermined temperature range capable of avoiding the occurrence of a crack. Here, note that the suppression of input energy according to the present invention means that the input energy is suppressed to be low, as compared with the input energy conducted through the exhaust gas from the internal combustion engine according to the operating state of the internal combustion engine, in the case where crack suppression in the heat generation element is not taken into consideration.

In addition, the heat generation element internal temperature difference is defined as a difference in temperature between those portions in the heat generation element in which a crack tends to occur according to the size, shape, etc., of the electrically heated catalyst which is arranged in the exhaust passage. In general, an outer surface of the heat generation element becomes a heat dissipation surface to the outside, and so it easily becomes low in temperature in comparison with the interior of the heat generation element, as a result of which a crack may occur in the heat generation element, resulting from a difference in temperature between the outer surface and the interior of the heat generation element. In such a case, said heat generation element internal temperature difference can be defined as the difference in temperature between the outer surface and the interior of the heat generation element. Then, the control unit controls the operating state of the internal combustion engine in order to achieve the restraint amount for the input energy decided by the decision unit. According to this, the energy possessed by the exhaust gas from the internal combustion engine, i.e., the energy of the exhaust gas flowing into the electrically heated catalyst, reflects the restraint amount, and as a result, a rise in temperature of the electrically heated catalyst due to the exhaust gas is alleviated or reduced. As a result of this, it is possible to avoid excessive enlargement of the heat generation element internal temperature difference, which tends to become a cause for cracks, between the predetermined portions in which a temperature difference tends to occur.

In particular, at the time of the cold starting of the internal combustion engine, the temperature of the electrically heated catalyst itself is in a relatively low temperature state, so a difference in temperature tends to occur between the predetermined portions of the heat generation element, but the input energy to the electrically heated catalyst is suppressed by means of the control unit, as mentioned above, thus making it possible to suppress the heat generation element internal temperature difference at the time of the cold starting from enlarging, with the result that the occurrence of cracks in the heat generation element can be avoided. The conventional technology is to increase input energy in order to attain activation of an electrically heated catalyst at the time of the cold starting of an internal combustion engine, but on the other hand, the present invention is intended to suppress input energy through an exhaust gas by means of controlling the operating state of the internal combustion engine, unlike the conventional technology.

Here, in said control apparatus for an internal combustion engine, based on a period of time elapsed from the cold starting of said internal combustion engine, said decision unit may calculate, as the restraint amount for said input energy, an upper limit integrated value which is an upper limit value of the integrated value of a predetermined parameter related to an amount of the exhaust gas flowing through said electrically heated catalyst, in order for said heat generation element internal temperature difference to fall within said predetermined temperature range, and then the control unit may control engine output power of the internal combustion engine in such a manner that an actual value of said predetermined parameter integrated from the cold starting of said internal combustion engine does not exceed said upper limit integrated value calculated by said decision unit, or becomes close to said upper limit integrated value.

That is, in the above-mentioned invention, the input energy supplied to the electrically heated catalyst through the exhaust gas is grasped through the integrated value of the predetermined parameter related to the amount of the exhaust gas flowing through the electrically heated catalyst integrated from the time of the cold starting. It is rationally considered that the input energy to the electrically heated catalyst increases as the integrated value of the amount of the exhaust gas increases. Accordingly, the input energy to the electrically heated catalyst at the time of the cold starting can be grasped through the integrated value of the predetermined parameter related to the amount of the exhaust gas, such as, for example, an amount of intake air in the internal combustion engine, the amount of exhaust gas itself, and so on. Then, the decision unit calculates an upper limit integrated value of that predetermined parameter, and the control unit makes a comparison between an actual integrated value and the upper limit integrated value, and controls the engine output power of the internal combustion engine so that the actual integrated value does not exceed the upper limit integrated value, or becomes close to the upper limit integrated value, thereby making the heat generation element internal temperature difference fall within the predetermined temperature range. As a result of this, it is possible to avoid the occurrence of cracks in the heat generation element at the time of the cold starting. Here, note that the engine output power of the internal combustion engine can be controlled through the amount of intake air, etc.

In addition, as another method of controlling the operating state of the internal combustion engine by means of said control unit, there can also be adopted a mode of controlling the air fuel ratio of the internal combustion engine. Specifically, in said control apparatus for an internal combustion engine, based on a period of time elapsed from the cold starting of said internal combustion engine, said decision unit may calculate, as the restraint amount for said input energy, an upper limit integrated value which is an upper limit value of the integrated value of the predetermined parameter related to the amount of the exhaust gas flowing through said electrically heated catalyst, in order for said heat generation element internal temperature difference to fall within said predetermined temperature range. And said control unit may control the temperature of the exhaust gas by regulating the air fuel ratio of the exhaust gas due to the combustion of fuel in the internal combustion engine, in such a manner that an actual value of said predetermined parameter integrated from the cold starting of said internal combustion engine does not exceed said upper limit integrated value calculated by said decision unit, or becomes close to said upper limit integrated value.

That is, in the above-mentioned invention, the input energy supplied to the electrically heated catalyst through the exhaust gas is grasped through the integrated value of the predetermined parameter from the time of the cold starting, and the input energy supplied by the exhaust gas actually flowing into the electrically heated catalyst is controlled based on the air fuel ratio of the exhaust gas due to the combustion of fuel in the internal combustion engine. In the internal combustion engine, a certain relation can be found out between the air fuel ratio of the exhaust gas and the temperature of the exhaust gas due to the combustion of fuel. Accordingly, in the present invention, by regulating the air fuel ratio of the exhaust gas thereby to control the temperature of the exhaust gas, it becomes possible to control the input energy to the electrically heated catalyst, and as a result, it is possible to suppress the enlargement of the heat generation element internal temperature difference at the time of the cold starting of the internal combustion engine, thereby making it possible to avoid the occurrence of cracks.

Then, for example, in cases where said internal combustion engine is a spark ignition internal combustion engine, said control unit may regulate a condition of combustion in said internal combustion engine in such a manner that the air fuel ratio of the exhaust gas becomes richer as the actual integrated value of said predetermined parameter becomes larger, thereby making the temperature of the exhaust gas lower. In the case of the spark ignition internal combustion engine, in general, when the air fuel ratio of the exhaust gas becomes in the vicinity of a stoichiometric air fuel ratio, the temperature of the exhaust gas becomes high, and the temperature of the exhaust gas becomes lower as the air fuel ratio of the exhaust gas shifts to a rich side. Accordingly, by making larger the actual integrated value of the predetermined parameter, the combustion condition is regulated in such a manner that the air fuel ratio of the exhaust gas is made into a richer side air fuel ratio as a deviation or divergence between the actual integrated value and the upper limit integrated value becomes larger, whereby the temperature of the exhaust gas can be made lower, thus making it possible to suppress the input energy to the electrically heated catalyst.

Here, in cases where in the control apparatus for an internal combustion engine as described up to the above, further provision is made for an estimation unit that is configured to estimate or detect the temperature of said electrically heated catalyst, said decision unit may reduce the restraint amount for the energy inputted through the exhaust gas to the electrically heated catalyst in accordance with the rising temperature of said electrically heated catalyst estimated or detected by said estimation unit. The present inventors have found that the difference in temperature between the predetermined portions in the heat generation element tends to become smaller as the temperature of the electrically heated catalyst becomes higher. Then, based on the fact that a possibility for a crack to occur becomes lower as the difference in temperature becomes smaller, it becomes possible to easily avoid the occurrence of cracks even if the restraint amount for the input energy through the exhaust gas is made smaller as the temperature of the electrically heated catalyst becomes higher. As a result, the extent of the control of the operating state of the internal combustion engine by means of the control unit is eased or made smaller, thus making it possible to attain the realization of output power close to original engine output power as well as the realization of an original state of the air fuel ratio of the exhaust gas.

Here, immediately after the cold starting of the internal combustion engine, when the exhaust gas of relatively high input energy flows into the electrically heated catalyst, there will be a possibility that the heat generation element internal temperature difference may be enlarged, and a crack may occur resulting from it, as referred to above. Then, as a case where the exhaust gas having relatively high input energy is discharged, there is mentioned the time of acceleration immediately after the cold starting of the internal combustion engine. Accordingly, in the control apparatus for an internal combustion engine as referred to above, the control of the operating state of said internal combustion engine according to the restraint amount for said input energy by means of said control unit may be carried out in a predetermined period of acceleration immediately after the cold starting of the internal combustion engine. By doing in this manner, the control of the operating state of the internal combustion engine by means of the control unit is carry out in a limited period of time, so that a deviation or divergence from the operating state of the internal combustion engine which should be originally carried out can be suppressed as much as possible.

Moreover, the control apparatus for an internal combustion engine as described up to the above can also be applied to an internal combustion engine which is mounted on a hybrid vehicle. In that case, the restraint amount for the energy inputted to the electrically heated catalyst may be regulated based on a phenomenon peculiar to the hybrid vehicle. Specifically, in the control apparatus for an internal combustion engine as referred to above, the internal combustion engine is mounted on the hybrid vehicle which uses, as a source of power, the internal combustion engine and a motor driven by electric power supplied from an electric power supply, and in that case, said decision unit may increase the restraint amount for the energy inputted to said electrically heated catalyst in accordance with the increasing travel speed of said hybrid vehicle at the time of the cold starting of said internal combustion engine.

In general, in the hybrid vehicle provided as a driving source with the internal combustion engine and the motor, driving only by the motor and driving by both the motor and the internal combustion engine are suitably changed according to conditions such as a driving load and a power supplying capacity of the electric power supply. For that reason, there can occur a situation where the internal combustion engine is in a state of engine stop, while the vehicle itself is traveling, as a result of which at the time when the internal combustion engine is cold started, there can also be a situation where the travel speed of the hybrid vehicle is relatively high. In particular, in hybrid vehicles of a form called PHV (plug-in hybrid), a region in which a vehicle can travel only by the motor is set to be wider from constructional reasons than in general hybrid vehicles, so the tendency of high speed of the vehicle at the time of cold starting of the internal combustion engine becomes strong. Then, when the cold starting of the internal combustion engine is carried out in a state where the travel speed of the hybrid vehicle is high, a relatively large amount of intake air will be supplied to the internal combustion engine simultaneously with the cold starting thereof, and as a result, a large amount of input energy will be introduced to the electrically heated catalyst, thus making it easy to induce a crack. Accordingly, as mentioned above, it is possible to avoid the enlargement of the heat generation element internal temperature difference, by increasing the restraint amount for the energy inputted to the electrically heated catalyst, i.e., suppressing the input energy to the greater extent, in accordance with the increasing travel speed of the hybrid vehicle at the time of the cold starting of the internal combustion engine.

Here, it is possible to take the present invention from another point of view. Specifically, the present invention resides in a control apparatus for an internal combustion engine which is mounted on a hybrid vehicle using, as a source of power, the internal combustion engine and a motor driven by electric power supplied from an electric power supply, said control apparatus comprising: an electrically heated catalyst that is arranged in an exhaust passage of the internal combustion engine, and heats a catalyst having an ability to purify an exhaust gas with heat from a heat generation element which generates the heat by supply of electric power thereto; and a pre-starting heat generation unit that supplies electric power to said electrically heated catalyst thereby to cause said heat generation element to generate heat before starting of the internal combustion engine, when said hybrid vehicle is traveling while using said motor as a source of power in a state where said internal combustion engine is stopped. Then, said pre-starting heat generation unit carries out the supply of electric power to said electrically heated catalyst based on the travel speed of said hybrid vehicle thereby to cause the electrically heated catalyst to rise in temperature, so that even in cases where said internal combustion engine is cold started, a heat generation element internal temperature difference, which is a difference in temperature between predetermined portions in said heat generation element of said electrically heated catalyst, falls within a predetermined temperature range.

The above-mentioned invention is one which relates to a control apparatus for an internal combustion engine which is mounted on a hybrid vehicle. As stated above, as a feature at the time of the cold starting of the internal combustion engine in the hybrid vehicle, there is mentioned the following: at the same time with the cold starting of the internal combustion engine, a relatively large amount of intake air is supplied to the internal combustion engine, and as a result, there can be a situation where a large amount of exhaust gas flows into the electrically heated catalyst. Thus, when a large amount of exhaust gas flows into the electrically heated catalyst at the time of the cold starting, it will result in that the input energy to the electrically heated catalyst may increase, and the heat generation element internal temperature difference may be enlarged. Accordingly, in the above-mentioned invention, if the internal combustion engine is cold started from a state where the vehicle is driven by the motor with the internal combustion engine being stopped, the electrically heated catalyst is caused to rise in temperature based on the vehicle speed at that time by means of the pre-starting heat generation unit. When the temperature of the electrically heated catalyst goes up, even if the exhaust gas flows thereinto, it will become difficult for the heat generation element internal temperature difference to enlarge, as referred to above, and thus, the enlargement of the heat generation element internal temperature difference is prevented by heating, prior to the actual cold starting, the electrically heated catalyst according to the vehicle speed in the case where the internal combustion engine is cold started, or in other words, according to the amount of intake air (or the amount of exhaust gas) related to the vehicle speed. Accordingly, the present invention avoids the enlargement of the heat generation element internal temperature difference by the supply of electric power to the electrically heated catalyst, while based on the energy inputted through the exhaust gas to the electrically heated catalyst.

Further, in the above-mentioned control apparatus for an internal combustion engine, said pre-starting heat generation unit may carry out the supply of electric power in such a manner that the higher the travel speed of said hybrid vehicle, the higher the temperature of said electrically heated catalyst becomes. By doing in this manner, it is possible to achieve prevention of the enlargement of the heat generation element internal temperature difference precisely based on the input energy supplied through the exhaust gas to the electrically heated catalyst.

Advantageous Effect of the Invention

In an internal combustion engine having an electrically heated catalyst, a control apparatus for an internal combustion engine is provided which controls an operating state of the internal combustion engine in an appropriate manner so that a difference in temperature leading to a crack does not occur in a heat generation element which is electrically energized to generate heat in the electrically heated catalyst.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Schematic Construction of a Hybrid System

Figure 1:
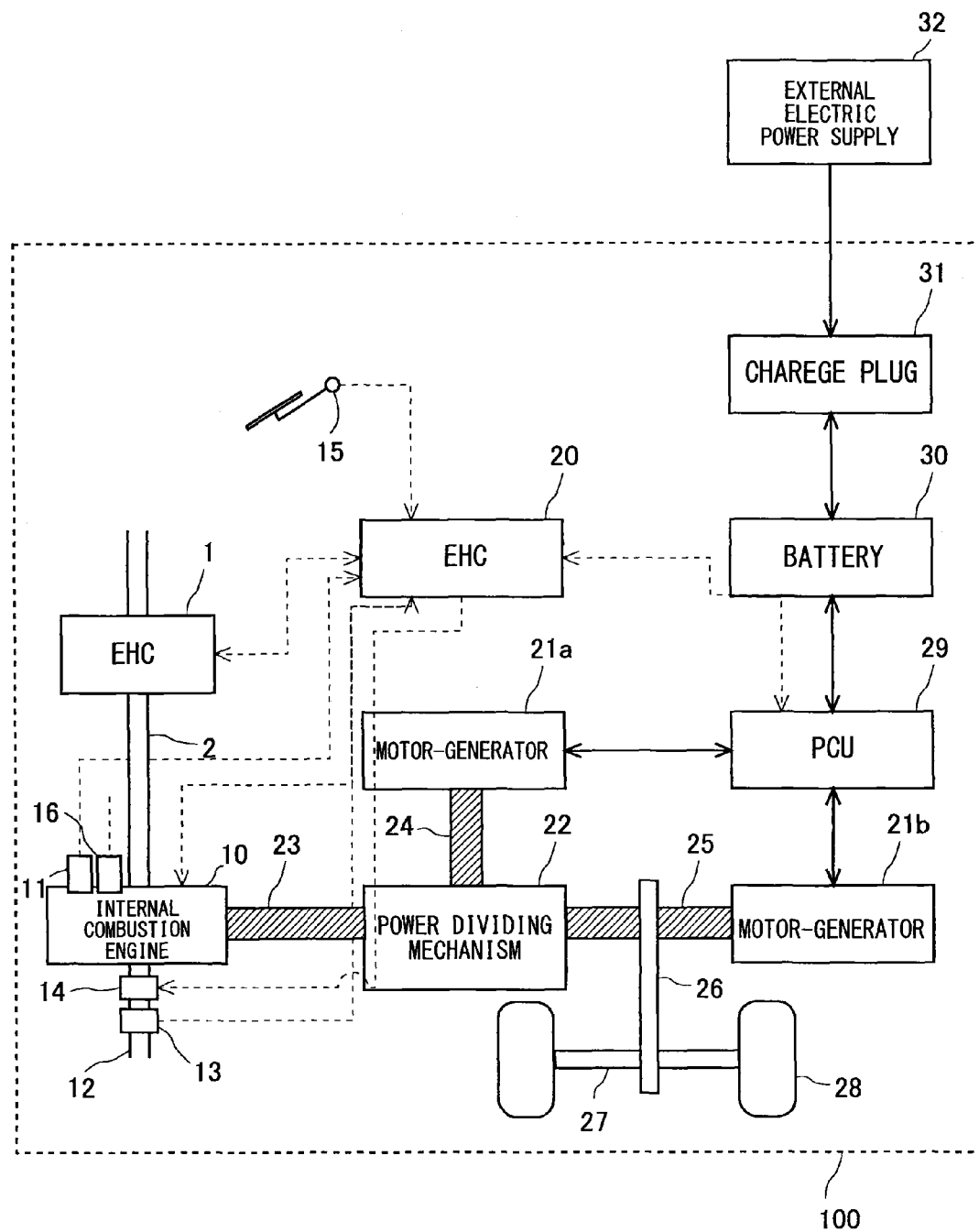
FIG. 1 is a view showing the schematic construction of a hybrid vehicle including a control apparatus for an internal combustion engine according to embodiments of the present invention, in which the internal combustion engine and a motor are used as a source of power.

FIG. 1 is a view showing the schematic construction of a hybrid vehicle 100 which is provided with a hybrid system having an internal combustion engine with a control apparatus according to embodiments of the present invention, and two sets of motor-generators (hereinafter referred to simply as "motors") acting as other driving sources. The hybrid vehicle 100 has the internal combustion engine 10 as a main source of power, and has a motor 21a and a motor 21b as auxiliary sources of power.

First, the hybrid system will be explained. A crankshaft of the internal combustion engine 10 is connected with an output shaft 23, and the output shaft 23 is connected with a power dividing mechanism 22. The power dividing mechanism 22 is connected with the motor 21a through a power transmission shaft 24, and at the same time, is also connected with the motor 21b through a power transmission shaft 25. Here, the power dividing mechanism 22 switches propagation of outputs of the internal combustion engine and the auxiliary power sources, etc., by means of a planetary gear mechanism. In addition, a reduction gear 26 is connected with the power transmission shaft 25 which is connected with the motor 21b, and drive wheels 28 are connected with the reduction gear 26 through drive shafts 27, respectively. The reduction gear 26 is constructed by a plurality of gear wheels combined with one another, and serves to transmit the outputs of the internal combustion engine 10, the motor 21a and the motor 21b to the drive shaft 27, while reducing the number of revolutions per unit time of the power transmission shaft 25.

Here, the motors 21a, 21b are electrically connected to a PCU (Power Control Unit) 29 including an unillustrated inverter, and the PCU 29 is further electrically connected to a battery 30. The PCU 29 is an electric power control unit which is constructed such that it serves to supply direct current power drawn out of the battery 30 to the motors 21a, 21b while converting it into alternating current power, and to supply the alternating current power generated by the motors 21a, 21b to the battery 30 while converting it into direct current power. Specifically, the motors 21a, 21b are composed of alternating current synchronous electric motors, respectively, and when an excitation current is applied thereto, they generate torque, and when torque is added thereto from the outside, e.g., when kinetic energy is inputted thereto through the power dividing mechanism 22 from the internal combustion engine 10, they generate electric power by converting the kinetic energy into electrical energy. The electric power thus generated is supplied to the battery 30 through the PCU 29. In addition, the motor 21b acts as an electric generator at the time of deceleration of the vehicle, and can carry out so-called regenerative power generation that converts into electrical energy the kinetic energy which is transmitted from the drive wheels 28 to the power transmission shaft 25 through the drive shafts 27 and the reduction gear 26, wherein the electric power thus generated is also supplied to the battery 30 through the PCU 29. Moreover, the hybrid vehicle 100 shown in FIG. 1 is a so-called plug-in hybrid vehicle, and is provided with a charge plug 31 so that the supply of electric power from an external electric power supply 32 can be made through the charge plug 31.

The internal combustion engine 1 used as the main power source of the hybrid vehicle 100 shown in FIG. 1 is a spark ignition internal combustion engine which has fuel injection valves (not shown) carrying out fuel injection into combustion chambers, respectively, and spark plugs (not shown). In an intake passage 12 of the internal combustion engine 1, there are arranged an air flow meter 13 for detecting a flow rate of intake air in the intake passage, and a throttle valve 14 is also arranged therein at the downstream side of the air flow meter 13 for regulating the flow rate of intake air in the intake passage 12. In addition, in an exhaust passage 2 of the internal combustion engine 1, there is arranged an EHC (electrically heated catalyst) 1 for carrying out exhaust gas purification. The EHC 1 is a device which attains to raise the temperature of a catalyst supported by a carrier by means of electrical energization to electrodes placed in the carrier, and a specific construction thereof will be described later.

Figure 2:
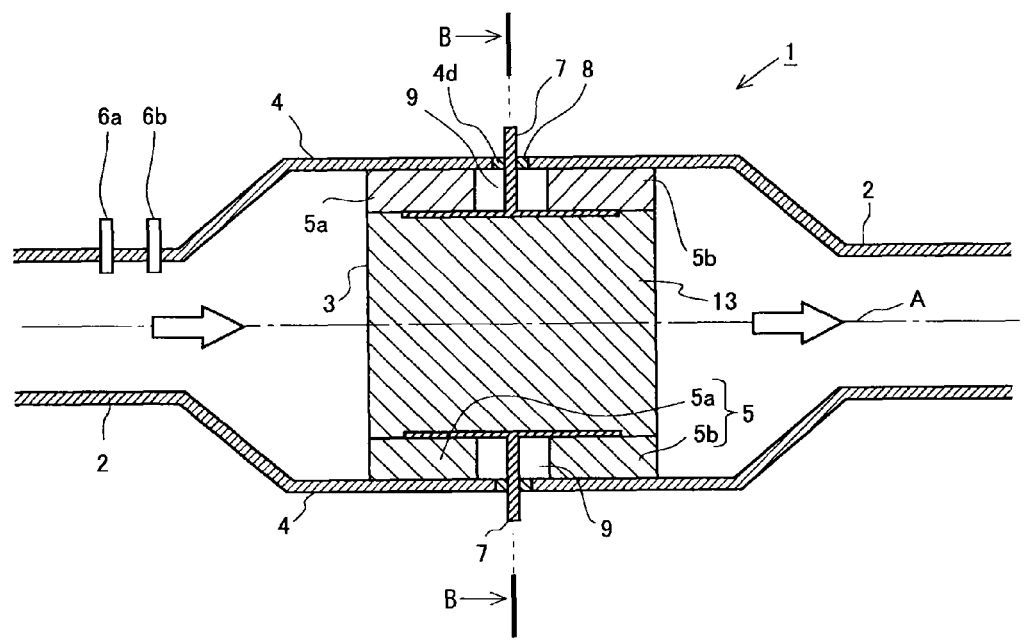
FIG. 2 is a first cross sectional view showing the construction of an electrically heated catalyst for purifying an exhaust gas of the internal combustion engine mounted on the hybrid vehicle shown in FIG. 1.

The hybrid vehicle 100 having the hybrid system constructed as described above is formed with an ECU 20 which is an electronic control unit for controlling the PCU 29 which controls fuel injection in the internal combustion engine 10 and the transfer of electric power between the motors 21a, 21b and the battery 30. Specifically, a crank position sensor 11 and an accelerator opening sensor 15 are electrically connected to the ECU 20, and the detected values of these individual sensors are delivered thereto, so that an operating state of the internal combustion engine 10 is grasped by the ECU 20. Further, the ECU 20 is also electrically connected to a water temperature sensor 16 for detecting the temperature of cooling water in the internal combustion engine 10, and to the above-mentioned air flow meter 13 and throttle valve 14. In addition, the ECU 20 carries out supervision of the amount of electricity stored in the battery 30, etc., through the PCU 29. For example, when the ECU 20 judges that the amount of electricity stored in the battery 30 is low, generation of electricity is carried out by making the engine output of the internal combustion engine 1 to be transmitted to the motor 21a, so that the electricity thus generated by the motor 21a is stored into the battery 30 through the PCU 29. Moreover, a temperature sensor 6a and an air fuel ratio sensor 6b, which are shown in FIG. 2, are also electrically connected to the ECU 20, and further, electrical connection is also formed in such a manner that electrical energization to the EHC 1 can be made to be controlled.

<Schematic Construction of the EHC>

Figure 3:
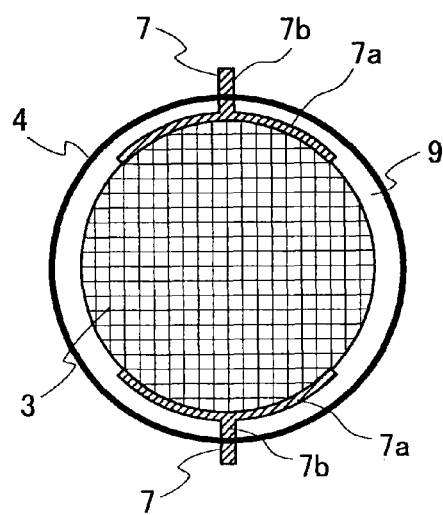
FIG. 3 is a second cross sectional view showing the construction of the electrically heated catalyst for purifying the exhaust gas of the internal combustion engine mounted on the hybrid vehicle shown in FIG. 1.

First, reference will be made to a specific construction of the EHC 1 based on FIG. 2 and FIG. 3. FIG. 2 is a cross sectional view of the EHC 1 along the direction of flow of the exhaust gas, wherein an outline arrow in FIG. 2 indicates the direction of flow of the exhaust gas in the exhaust passage 2. In addition, FIG. 3 is a cross sectional view along line B-B shown in FIG. 2. The EHC 1 is provided with a catalyst carrier 3, a case 4, a mat 5, and electrodes 7. The catalyst carrier 3 is received in the case 4. The catalyst carrier 3 is formed in the shape of a circular column, and is arranged in such a manner that a central axis thereof is in alignment with a central axis A of the exhaust passage 2. The central axis A is a common central axis with respect to the exhaust passage 2, the catalyst carrier 3, and the case 4. A three-way catalyst 31 is carried or supported by the catalyst carrier 3. Here, note that a catalyst supported by the catalyst carrier 3 is not limited to the three-way catalyst, but may be an oxidation catalyst, an NOx storage reduction catalyst, or an NOx selective reduction catalyst, and a catalyst suitable for exhaust gas purification can be selected, as the case may be.

The catalyst carrier 3 is formed of a material which, when electrically energized, becomes an electric resistance to generate heat. As a material for the catalyst carrier 3, there can be mentioned SiC by way of example. The catalyst carrier 3 has a plurality of passages which extend in a direction in which the exhaust gas flows (i.e., the direction of the central axis A), and which have a cross section of honeycomb shape vertical to the direction in which the exhaust gas flows. The exhaust gas flows through these passages. Here, note that the cross sectional shape of the catalyst carrier 3 in a direction orthogonal to the central axis A may also be elliptical, etc.

The pair of electrodes 7 are connected to the outer peripheral surface of the catalyst carrier 3. Each electrode 7 is formed of a surface electrode 7a and a shaft electrode 7b. Each surface electrode 7a extends along the outer peripheral surface of the catalyst carrier 3 in a circumferential direction and in the axial direction, i.e., in such a manner as to cover the outer peripheral surface of the catalyst carrier 3. In addition, the surface electrodes 7a are arranged on the outer peripheral surface of the catalyst carrier 3 in such a manner that they are mutually opposed to each other with the catalyst carrier 3 being sandwiched therebetween. Each shaft electrode 7b has one end thereof connected to a corresponding surface electrode 7a. And, each shaft electrode 7b has the other end thereof protruded to the outside of the case 4 through an electrode chamber 9 formed inside the case 4. Electric power is supplied from the battery 30 to the electrodes 7 constructed in this manner, so that electrical energization to the catalyst carrier 3 is carried out. When the catalyst carrier 3 generates heat by this electrical energization, the three-way catalyst 13 supported by the catalyst carrier 3 is heated, so that the activation thereof is facilitated. Thus, the supply of electric power through the electrodes 7 for the activation of the catalyst in the EHC 1 is controlled by the ECU 20.

Here, the case 4 is formed of metal. As a material which forms the case 4, there can be mentioned a stainless steel material, by way of example. The mat 5 is inserted between an inner wall surface of the case 4 and the outer peripheral surface of the catalyst carrier 3. In other words, in the inside of the case 4, the catalyst carrier 3 is supported by the mat 5. This mat 5 is formed of an electrically insulating material. As a material which forms the mat 5, there can be mentioned, by way of example, a ceramic fiber which includes alumina as a main component. In this manner, due to the insertion of the mat 5 between the catalyst carrier 3 and the case 4, it is possible to suppress electricity from leaking to the case 4 at the time when the catalyst carrier 3 is electrically energized. In addition, the mat 5 is divided into an upstream side portion 5a and a downstream side portion 5b, with a space being formed between the upstream side portion 5a and the downstream side portion 5b, wherein the space defines the electrode chamber 9 through which the shaft electrodes 7b of the electrodes 7 pass. Here, note that spaces, each of which becomes an electrode chamber, may be defined by forming through holes only in those portions of the mat 5 through which the electrodes 7 pass, without dividing the mat 5 into the upstream side portion 5a and the downstream side portion 5b.

In addition, electrode support members 8, which serve to support the shaft electrodes 7b, respectively, are arranged or inserted in the through holes 4d which are formed in the case 4 so as to allow the shaft electrodes 7b to pass therethrough. These electrode support members 8 are each formed of an electrically insulating material, so that electrical insulation is kept between the case 4 and the shaft electrodes 7b.

Here, note that in this embodiment, the catalyst carrier 3 corresponds to a heat generation element according to the present invention. However, the heat generation element according to the present invention is not limited to a carrier which supports a catalyst, but instead the heat generation element may be a structure which is arranged at the upstream side of a catalyst, for example, and in this case, heating of the catalyst will be carried out by the heat of the heat generation element being transmitted to the catalyst.

<Heat Distribution in the EHC and Output Suppression Control at the Time of Cold Starting>

Figure 4:
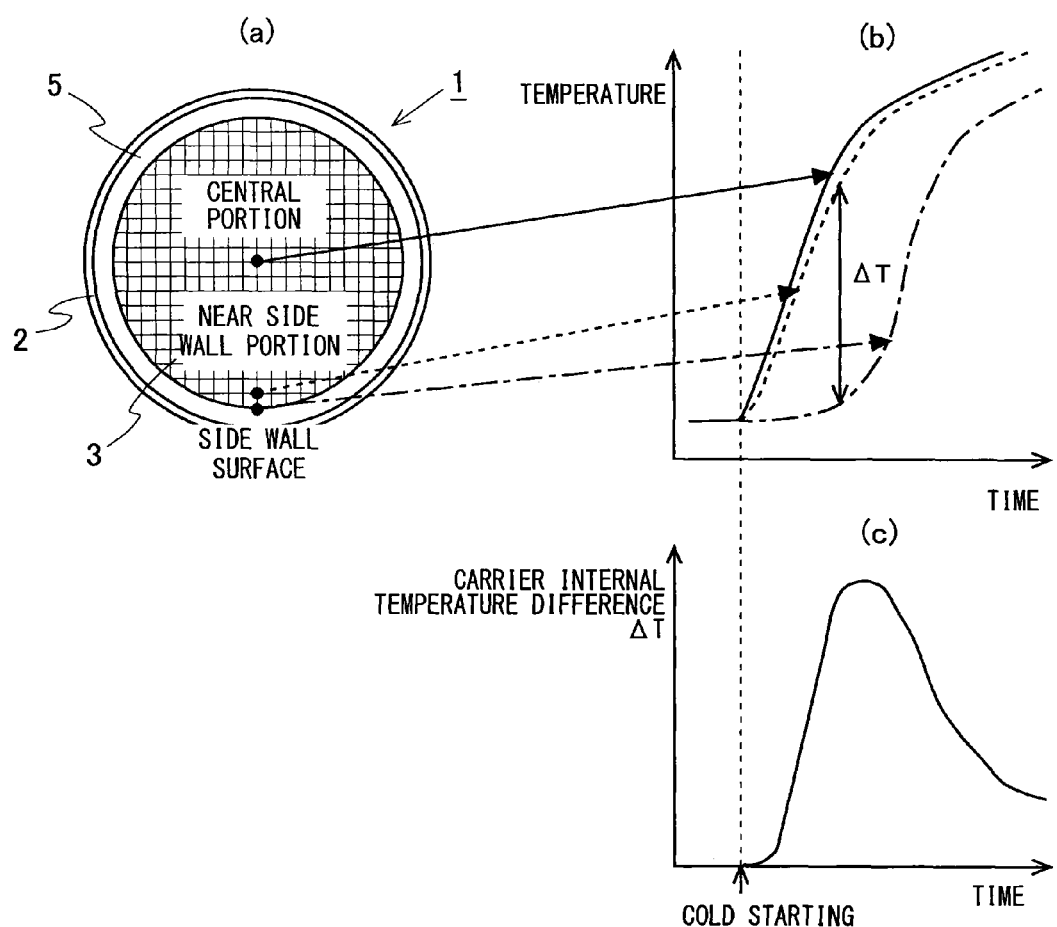
FIG. 4 is a view showing the change over time of the temperature of each portion inside a carrier in the electrically heated catalyst shown in FIG. 2 and FIG. 3.

FIG. 4 is a view for explaining the change over time of the temperature of the catalyst carrier 3 of the EHC 1 at the time of cold starting of the internal combustion engine 10 in a schematic manner. (a) of FIG. 4 (hereinafter FIG. 4(a)) is a cross sectional view in the case of cutting the EHC 1 in a direction orthogonal to a central axis thereof. Here, note that in FIG. 4(a), the electrodes 7 are omitted for the sake of convenience. (b) of FIG. 4 (hereinafter FIG. 4(b)) is a view for showing the change over time of the temperature of each portion of the catalyst carrier 3 at the time of cold starting of the internal combustion engine 10. In FIG. 4(b), the axis of abscissa represents time, and the axis of ordinate represents the temperature of the catalyst carrier 3, wherein an alternate long and short dash line indicates the change over time of the temperature of a side wall surface (a surface being in contact with the mat 5) of the catalyst carrier 3; a broken line indicates the change over time of the temperature of a portion inside the catalyst carrier 3 in the vicinity of a side wall thereof (hereinafter a near side wall portion) (e.g., a portion thereof lying inside away about 5 mm from the side wall surface); and a solid line indicates the change over time of the temperature of a central portion of the catalyst carrier 3. (c) of FIG. 4 (hereinafter FIG. 4(c)) is a view showing the change over time of a difference in temperature (hereinafter, referred to as "a carrier internal temperature difference") ΔT between the side wall surface of the catalyst carrier 3 and the near side wall portion in the interior thereof at the time of the cold starting of the internal combustion engine 10.

In cases where the catalyst carrier 3 is raised in temperature due to the exhaust gas, the side wall surface of the catalyst carrier 3 has a large amount of heat dissipation to the mat 5, so the temperature thereof does not go up easily, in comparison with the interior thereof. For that reason, as shown in FIG. 4, when the energy supplied to the catalyst carrier 3 by the exhaust gas from the internal combustion engine 10 increases rapidly at the time of the cold starting of the internal combustion engine 10, a difference in temperature will occur between the side wall surface and the interior in the catalyst carrier 3. In particular, a temperature difference DT between the side wall surface of the catalyst carrier 3 and the near side wall portion thereof tends to become large. And, when such a temperature difference ΔT between the side wall surface and the near side wall portion in the catalyst carrier 3 is enlarged too much, there will be a fear that a crack may occur in the catalyst carrier 3.

In the EHC 1, when a crack occurs in a portion of the catalyst carrier 3, an electric resistance value of the cracked portion will become higher than the other portions thereof. For that reason, when the EHC 1 is electrically energized, distribution of the amount of electrical energization in the catalyst carrier 3 will become nonuniform, and a larger difference in temperature will occur in the catalyst carrier 3, thus giving rise to a fear that a further increase in size and/number of cracks may be caused, as a result of which the occurrence of even a minute crack has to be avoided.

Figure 5:
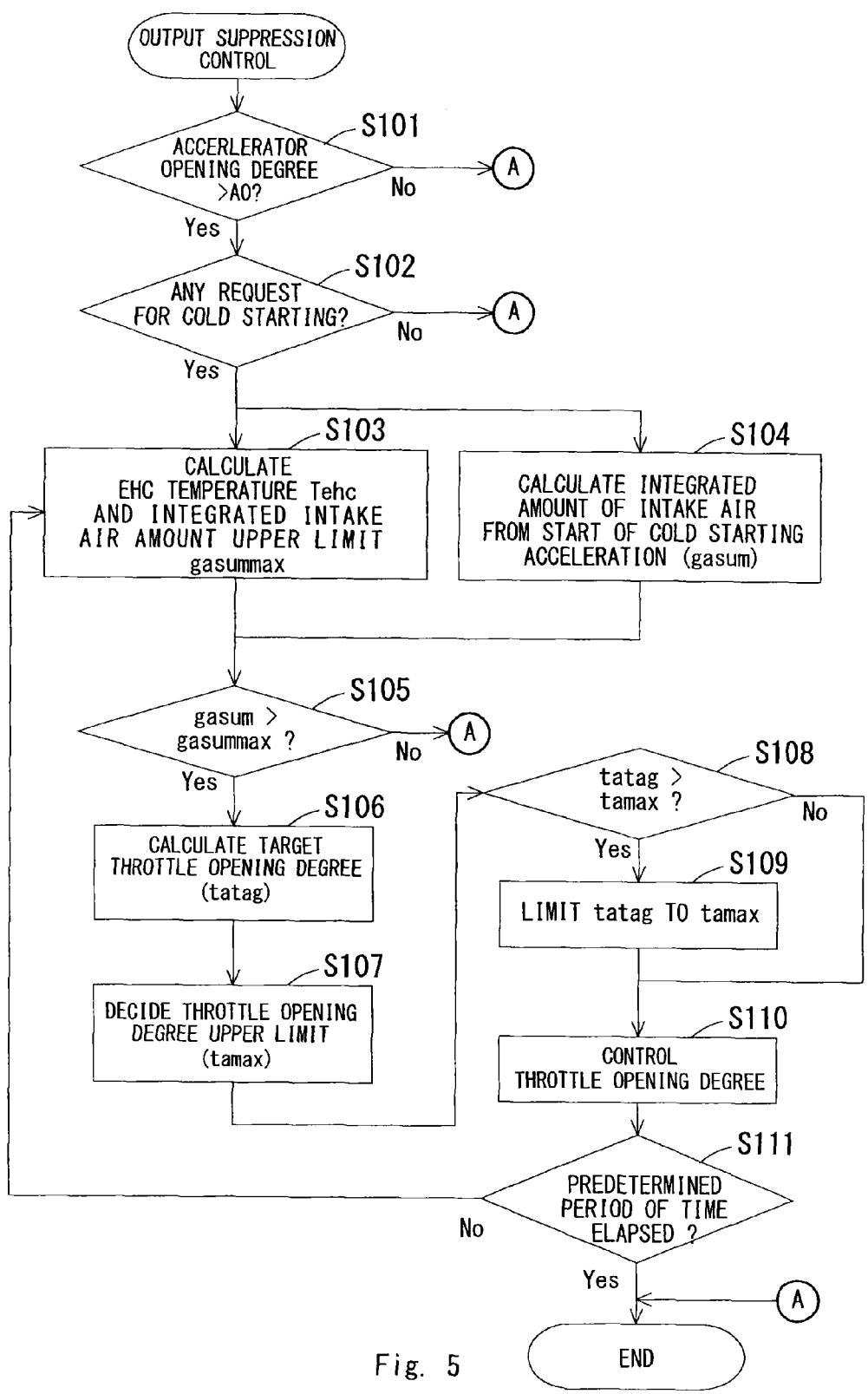
FIG. 5 is a first flow chart with respect to the control for suppressing enlargement of a carrier internal temperature difference of the electrically heated catalyst, which is carried out by the control apparatus for an internal combustion engine according to an embodiment of the present invention.

Accordingly, it is preferable that in particular at the time of the cold starting of the internal combustion engine 10 in which a crack tends to occur, the control of suppressing the crack from occurring in the catalyst carrier 3 be carried out, and a specific example of such control will be explained based on FIG. 5. FIG. 5 is a flow chart of output suppression control carried out by the ECU 20, and this control is carried out by means of the ECU 20 in a repeated manner at each predetermined time interval. This ECU 20 corresponds substantially to a computer including a CPU, a memory and so on, in which by the execution of control programs, the control according to the flow chart shown in FIG. 5 and various kinds of control to be described later are carried out.

First, in step S101, it is determined, based on the value detected by the accelerator opening sensor 15, whether the accelerator opening degree in the vehicle 100 is larger than a predetermined degree of opening A0 which becomes a reference. This predetermined degree of opening A0 is a threshold value for determining whether a rapid acceleration request to the internal combustion engine 10 included in the above-mentioned hybrid system has been made. When an affirmative determination is made in step S101, the control flow goes to step S102, whereas when a negative determination is made, the control flow is ended.

Then, in step S102, it is determined whether a request for cold starting has been made to the internal combustion engine 10. In general, the cold starting of the internal combustion engine is engine starting in the case where the temperature of the internal combustion engine is relatively low. However, in the internal combustion engine 10 included in the hybrid system, an "EV travel" mode, in which the vehicle 100 travels only by the driving forces of the motors 21a, 21b, and an "HV travel" mode, in which the vehicle 100 travels by the driving force of the internal combustion engine 1 together with those of both of the motors, are changed in an appropriate manner, according to a travel request of a vehicle driver, as a result of which the cold starting in the internal combustion engine 10 includes engine starting at the time when the entire hybrid system has been stopped, and engine starting at the time when the travel state of the vehicle 100 is switched over from the EV travel mode to the HV travel mode. Here, note that whether the engine starting of the internal combustion engine 10 is cold starting or not is determined based on the temperature of cooling water detected by the water temperature sensor 16, a period of time in which the internal combustion engine 10 has been stopped (i.e., a soak period of time of the internal combustion engine 10), etc. When an affirmative determination is made in step S102, the control flow goes to step S103, whereas when a negative determination is made, the control flow is ended.

Next, reference will be made to the case where the processing goes to step S103. In cases where an affirmative determination is made in both steps S101 and S102, the control flow will go to step S103. At this time, a request for relatively large acceleration is made to the internal combustion engine 10 at the time of cold starting, as a result of which the internal combustion engine 10 will be placed in a state (hereinafter, referred to as a "cold starting acceleration state") where the energy inputted or supplied to the catalyst carrier 3 of the EHC 1 can be increased rapidly. When the input energy to the catalyst carrier 3 is increased rapidly, it will become easy for the carrier internal temperature difference to be enlarged which causes the occurrence of cracks, as explained based on FIG. 4. Accordingly, the processing after step S103 onward is carried out in order to suppress the occurrence of cracks in the catalyst carrier 3.

Then, in step S103, a temperature Tehc of the catalyst carrier 3 of the EHC 1 (hereinafter, referred to as an "EHC temperature") is calculated based on the detected value of the temperature sensor 6a, and an upper limit value (hereinafter, referred to as an "upper limit of an integrated amount of intake air") of an integrated value of an amount of intake air (hereinafter referred to as an "integrated amount of intake air") in the internal combustion engine 10 which is in a cold starting acceleration state is calculated based on the EHC temperature Tehc and a period of time elapsed after the internal combustion engine 10 is cold started. This upper limit of the integrated amount of intake air (hereinafter referred to as the integrated intake air amount upper limit) is a limit value with respect to the integrated amount of intake air, which is set so as to suppress the rapid energy input to the catalyst carrier 3. Accordingly, the integrated intake air amount upper limit corresponds to "an amount of restraint or suppression (a restraint amount) for the input energy through the exhaust gas" in the present invention, and the processing according to the step S103 corresponds to processing according to a decision unit.

Figure 6:
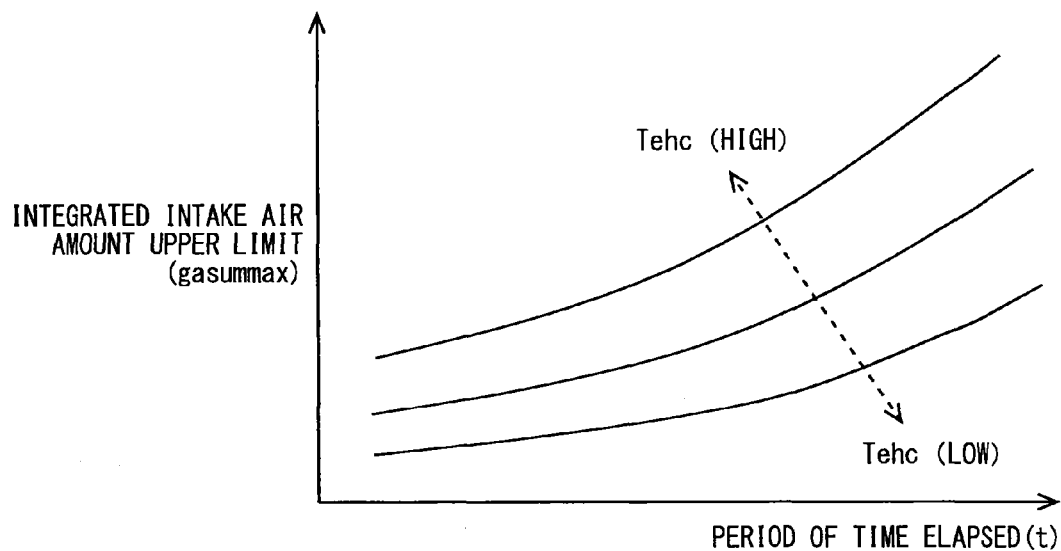
FIG. 6 is a view showing a correlation between the period of time elapsed from cold starting and the temperature of the electrically heated catalyst for calculating an upper limit of integration (summation) Ga in a control flow shown in FIG. 5.

Here, an example of the calculation of the integrated intake air amount upper limit gasummax will be explained based on FIG. 6. FIG. 6 shows a map in which an axis of abscissa represents a period of time elapsed from cold starting, and an axis of ordinate represents the integrated intake air amount upper limit gasummax. According to this map, the integrated intake air amount upper limit gasummax is calculated based on the elapsed period of time from the cold starting. In the map, there is a tendency that the shorter the elapsed period of time, the smaller becomes the integrated intake air amount upper limit gasummax, as shown in FIG. 6, and the rate of increase of the integrated intake air amount upper limit becomes larger with the passage of time. In addition, the present inventors have found a tendency that with respect to the catalyst carrier 3, the lower the EHC temperature, it becomes easy for the carrier internal temperature difference $\Delta T$ to occur to a larger extent. Accordingly, the relative relation between the elapsed period of time and the integrated intake air amount upper limit gasummax is set in such a manner that the lower the bed temperature Tehc of the catalyst carrier 3 itself, the smaller the value of the integrated intake air amount upper limit gasummax with respect to the elapsed period of time becomes in comparison with a state in which the bed temperature Tehc of the catalyst carrier 3 is high. In this manner, the integrated intake air amount upper limit gasummax is calculated based on both the elapsed time from the cold starting, and the EHC temperature Tehc, thereby making it possible to achieve the input or supply of energy exactly based on a thermal state of the catalyst carrier 3.

In addition, after an affirmative determination is made in steps S102, the processing of step S104 is carried out in parallel to the processing of step S103. In this step S104, integration (summation) of an actual amount of intake air Ga from the cold starting of the internal combustion engine 10 is carried out, so that an integrated amount of intake air gasum is calculated. Specifically, integration processing of the detected value of the air flow meter 13 is carried out. After the above-mentioned processings of the steps S103, S104 is carried out, determination processing of step S105 is carried out. In step S105, it is determined whether the integrated amount of intake air gasum calculated in step S104 is larger than the integrated intake air amount upper limit gasummax calculated in step S103. An affirmative determination in step S105 means a possibility that an excessive amount of energy may be inputted or supplied to the catalyst carrier 3 at the time of cold starting, thereby enlarging the carrier internal temperature difference $\Delta T$. Accordingly, in cases where an affirmative determination is made in step S105, processings from step S106 onward are carried out, in order to suppress the excessive supply of energy. On the other hand, in cases where a negative determination is made in step S105, it is considered that the carrier internal temperature difference $\Delta T$ is not enlarged to such an extent that there is fear that a crack may occur, and hence, the processings from step S106 onward are not carried out, and this control is ended.

Subsequently, in step S106, a target opening degree (hereinafter, referred to as a "target throttle opening degree") tatag of the throttle valve 14 for satisfying an amount of intake air necessary in order to achieve an acceleration request according to the accelerator opening degree is calculated based on the detected value of the accelerator opening sensor 15. Specifically, the target throttle opening degree tatag is calculated from a control map stored in the ECU 20, based on the relative relation among the detected accelerator opening degree, the engine rotational speed of the internal combustion engine 10, and the output torques of the motors 21a, 21b. After the processing of step S106 ends, the control flow goes to step S106.

Figure 7:
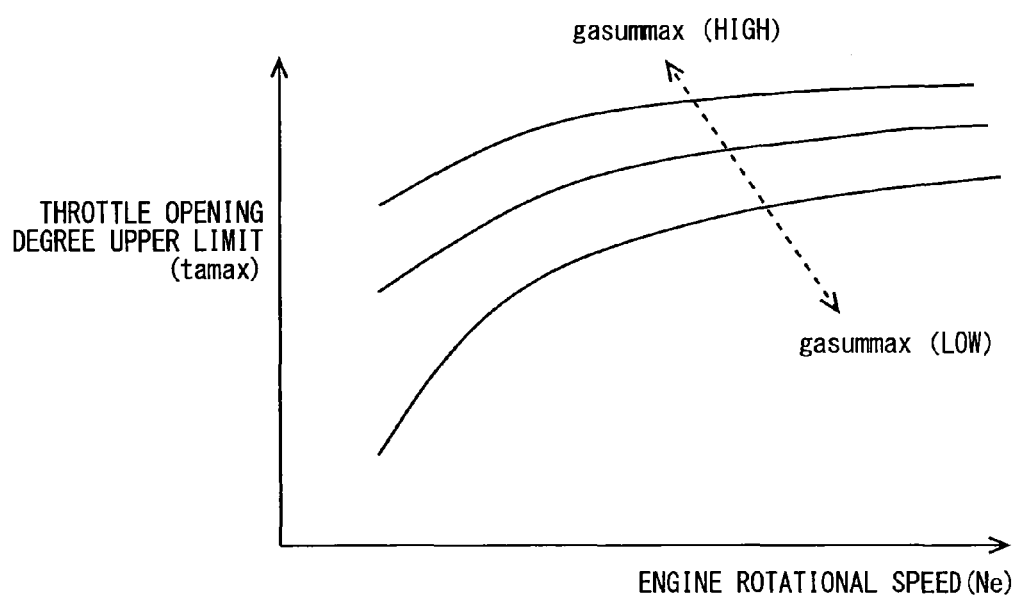
FIG. 7 is a view showing a correlation between an engine rotational speed and the upper limit of integration Ga for calculating an upper limit of a throttle opening degree in the control flow shown in FIG. 5.

In step S107, a degree of opening (hereinafter, referred to as a "throttle opening degree upper limit") tamax of the throttle valve 14, which should be taken in order to achieve the integrated intake air amount upper limit gasummax calculated in step S103, is decided. This throttle opening degree upper limit tamax is a limiting value with respect to the degree of opening of the throttle valve 14 which achieves an amount of intake air for preventing the carrier internal temperature difference $\Delta T$ of the catalyst carrier 3 from being enlarged to an excessive extent. The decision of this throttle opening degree upper limit tamax will be explained based on FIG. 7. FIG. 7 shows a map in which an axis of abscissa represents the engine rotational speed, and an axis of ordinate represents the throttle opening degree upper limit tamax. According to this map, the throttle opening degree upper limit tamax is calculated based on the engine rotational speed. As a general characteristic feature of the internal combustion engine 10, the degree of opening of the throttle valve 14 becomes larger as the engine rotational speed becomes higher. In addition, as described above, there is a tendency that the lower the bed temperature Tehc of the catalyst carrier 3, the larger becomes the carrier internal temperature difference $\Delta T$ in the catalyst carrier 3, and hence, it is preferable that the energy to be inputted or supplied to the EHC 1 is suppressed lower. Accordingly, based on the fact that the lower the EHC temperature Tehc, the smaller value the value of the integrated intake air amount upper limit gasummax is calculated to be, as shown in FIG. 6, the relative relation between the engine rotational speed and the throttle opening degree upper limit tamax is set in such a manner that the smaller the value of the integrated intake air amount upper limit gasummax, the smaller becomes the value of the throttle opening degree upper limit tamax with respect to the engine rotational speed, as shown in FIG. 7. In this manner, the throttle opening degree upper limit tamax is decided based on both of the engine rotational speed and the integrated intake air amount upper limit gasummax on which the EHC temperature Tehc is reflected, whereby it becomes possible to achieve intake air amount control for energy input exactly based on the thermal state of the catalyst carrier 3. After the processing of the step S107 is completed or ended, the control flow goes to step S108.

In step S108, it is determined whether the target throttle opening degree tatag is larger than the throttle opening degree upper limit tamax. Stated in another way, based on the fact that when the amount of intake air increases, the amount of exhaust gas flowing into the EHC 1 increases and as a result, the energy inputted or supplied to the EHC 1 also increases, the determination processing in step S108 is to determine whether the amount of intake air for achieving a requested operating state of the internal combustion engine 10 is an amount of intake air with which the carrier internal temperature difference ΔT can be made to enlarge. Accordingly, when an affirmative determination is made in step S108, a judgment can be rationally made that the carrier internal temperature difference ΔT can be enlarged, and so, the control flow goes to step S109, where the value of the target throttle opening degree tatag is limited to the throttle opening degree upper limit tamax. On the other hand, when a negative determination is made in step S108, the limitation with respect to the target throttle opening degree tatag is not carried out.

Then, after processings of steps S108, S109, in step S110, the degree of opening of the throttle valve 14 is controlled according to the target throttle opening degree tatag. As a result of this, in cases where the limitation is applied to the target throttle opening degree tatag in step S109, the degree of opening of the throttle valve 14 is controlled so as to be the limited degree of opening, whereas in cases where the limitation is not applied to the target throttle opening degree tatag in step S109, the degree of opening of the throttle valve 14 is controlled so as to be the value calculated in step S106. After the processing of the step S110 is ended, the control flow goes to step S111.

In step S111, it is determined whether a predetermined period of time has elapsed after the beginning of the cold starting of the internal combustion engine 10. This predetermined period of time is defined as a period of time until a condition is reached in which the EHC temperature Tehc rises to a certain extent and a crack does not occur resulting from the carrier internal temperature difference ΔT. Accordingly, when an affirmative determination is made in step S111, it is judged that there is a low possibility that a crack will occur in the catalyst carrier 3, and this control is ended, whereas when a negative determination is made, there will still be a possibility of the occurrence of cracks in the EHC 1, and hence, the processings from step S103 onward will be repeated. Here, note that in the above-mentioned step S111, the continuation of this control is determined according to the passage of the predetermined period of time, but as an alternate method, the continuation of this control may be determined based on the EHC temperature Tehc at the current point in time. From the above, the processings of the above-mentioned steps S103 through S111 correspond to processing by a control unit according to the present invention.

In this manner, according to this output suppression control, at the time of the cold starting of the internal combustion engine 10, the integrated amount of intake air will be controlled according to a variety of parameters such as the EHC temperature Tehc, etc., so as not to exceed the limiting value for preventing the carrier internal temperature difference ΔT in the catalyst carrier 3 from being enlarged to an excessive extent. As a result, it becomes possible to suppress the occurrence of cracks in the EHC 1. Here, note that in this control, the upper limit value is set for the integrated amount of intake air so as to attain the suppression of the occurrence of cracks, so the output of the internal combustion engine 10 will be suppressed as a result thereof. However, this control limits the integrated amount of intake air from immediately after the cold starting of the internal combustion engine 10, thus not resulting in a situation where the output power thereof is suddenly limited in the course of acceleration. For that reason, it becomes difficult for the driver to feel deterioration in the drivability of the hybrid vehicle 100.

Figure 8:
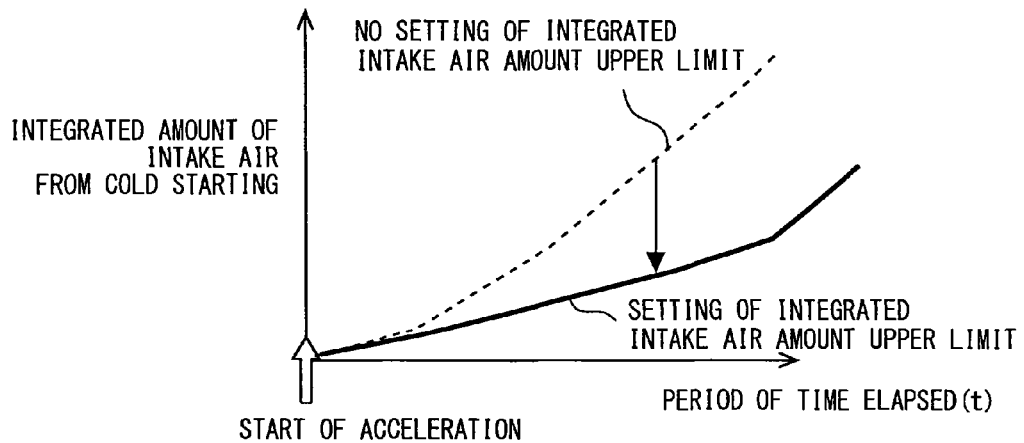
FIG. 8 is a view showing the integration Ga from the cold starting and the change over time of Ga, when the control flow shown in FIG. 5 is carried out.
Figure 8:
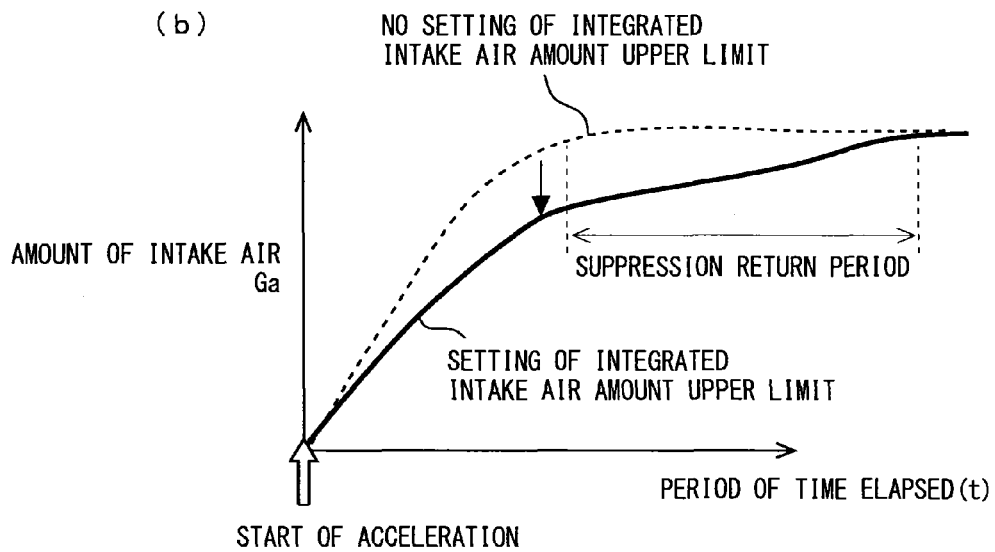

Here, reference will be made to the effect or advantage of the control apparatus according to the present invention, based on FIG. 8, FIG. 9A and FIG. 9B. First, FIG. 8(a) shows the change over time of the integrated amount of intake air at the time of the output suppression control shown in FIG. 5 being carried out, and FIG. 8(b) shows by way of example the change over time of the amount of intake air Ga. Here, note that in FIG. 8, the change overtime shown by a solid line relates to this output suppression control, and a broken line relates to a conventional technology, i.e., a form or mode in which the processing of limiting the amount of intake air by the integrated intake air amount upper limit is not carried out. As shown in FIG. 8(a), in this control, the integrated intake air amount upper limit is set from immediately after the start of acceleration in the cold starting, and so, the rate of increase of the integrated amount of intake air in the early stage of acceleration is low in comparison with the case where there is no such a setting. After that, the setting of the integrated intake air amount upper limit is released by ending this control according to the determination in step S111, whereby the rate of increase of the integrated amount of intake air becomes substantially the same level as in the case where there is no such a setting.

Then, the change over time of the amount of intake air when such a limitation of the integrated amount of intake air is carried out is shown in FIG. 8(b). As can be seen from this, in this control, the amount of intake air Ga is also suppressed to be low from immediately after the start of acceleration in the cold starting, in comparison with the case where there is no setting of the integrated intake air amount upper limit. For that reason, as mentioned above, there is no need to throttle the amount of intake air Ga suddenly in order to suppress the enlargement of the carrier internal temperature difference, and hence, there can be avoided a situation where the output of the internal combustion engine 10 is limited to a large extent in the course of acceleration, thus making it possible to reduce the deterioration of drivability.

Figure 9A:
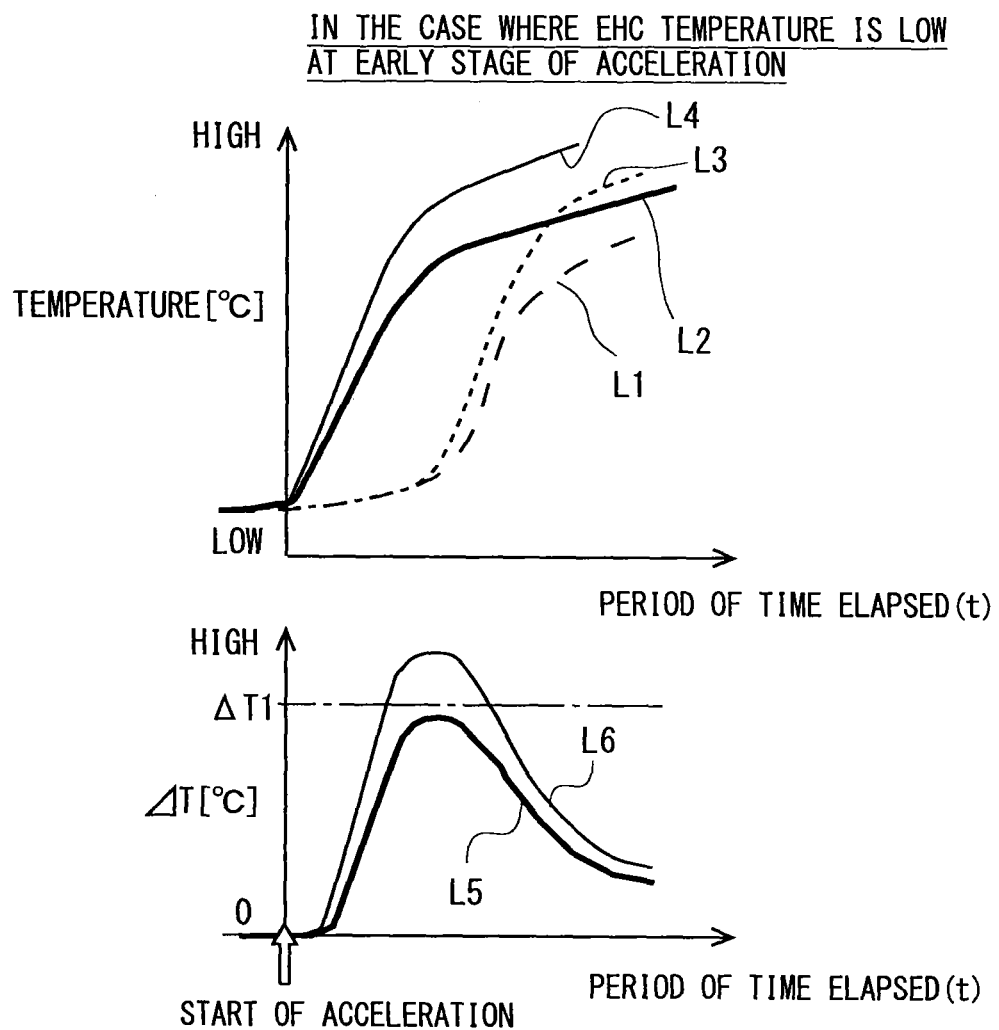
FIG. 9A is a first view showing the change overtime of the temperature of each portion of the electrically heated catalyst and the change overtime of the carrier internal temperature difference when the control flow shown in FIG. 5 is carried out.
Figure 9B:
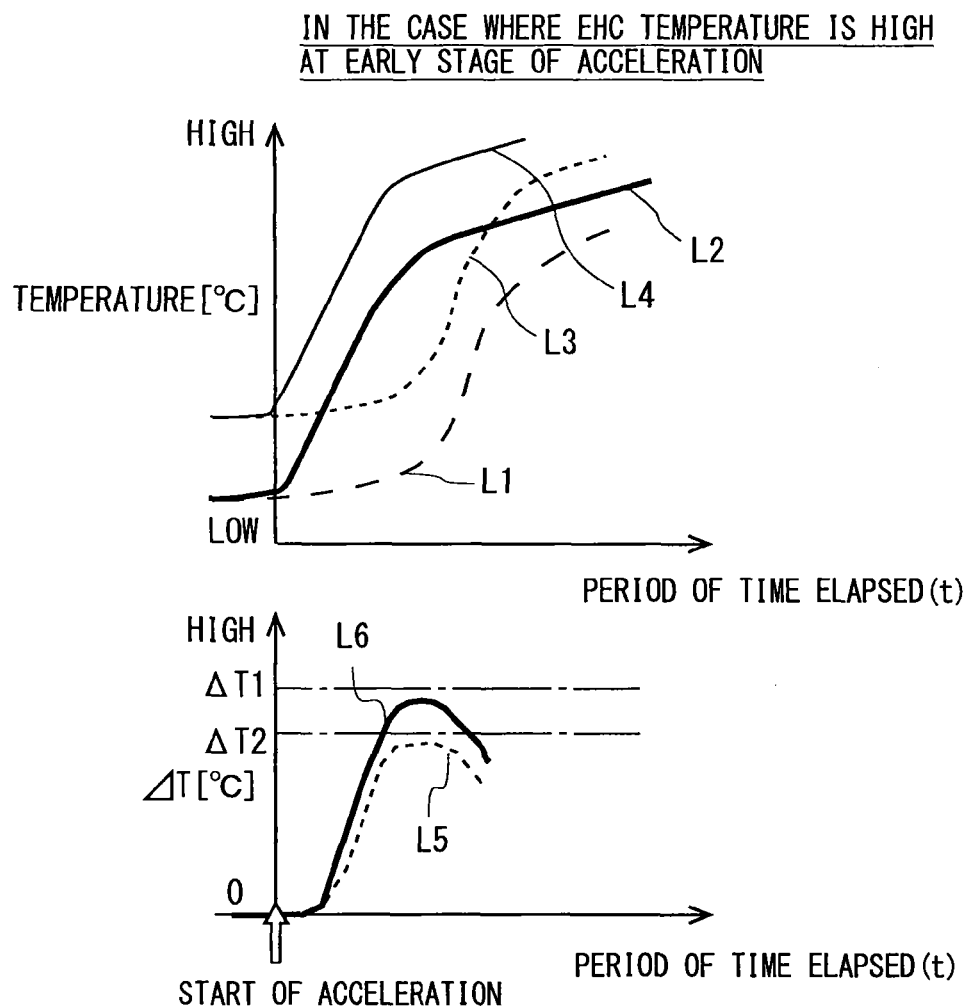
FIG. 9B is a second view showing the change over time of the temperature of each portion of the electrically heated catalyst and the change over time of the carrier internal temperature difference when the control flow shown in FIG. 5 is carried out.

Next, in FIG. 9A and FIG. 9B, the temperature changes over time of the side wall surface and the near side wall portion of the catalyst carrier 3 are shown in an upper part of each figure, and the change over time of the carrier internal temperature difference ΔT is shown by way of example in a lower part of each figure. Specifically, in both of the figures, a line L1 indicates the temperature change over time of the side wall surface of the catalyst carrier 3 at the time of this output suppression control being carried out, and a line L2 indicates the temperature change over time of the near side wall portion of the catalyst carrier 3 at the time of this output suppression control being carried out, wherein the carrier internal temperature difference ΔT, which is the difference in temperature between the side wall surface and the near side wall portion related to both of the lines, is indicated by a line L5. Similarly, in both of the figures, a line L3 indicates the temperature change over time of the side wall surface of the catalyst carrier 3 in the case of this output suppression control being not carried out, i.e., in the conventional technology, and a line L4 indicates the temperature change over time of the near side wall portion of the catalyst carrier 3 in the conventional technology, wherein the carrier internal temperature difference ΔT, which is the difference in temperature between the side wall surface and the near side wall portion related to both of the lines, is indicated by a line L6.

In addition, FIG. 9A is a view showing the change over time of each parameter when the EHC temperature is relatively low at the early stage of acceleration in a state where the internal combustion engine 10 is accelerated in the cold starting thereof, whereas on the contrary, FIG. 9B is a view showing the change over time of each parameter when the EHC temperature is relatively high at the early stage of acceleration. As also shown in these figures, by this output suppression control being carried out, it is possible to maintain the carrier internal temperature difference ΔT equal to or less than a threshold value ΔT1 (i.e., a temperature range equal to or less than this criterion corresponds to a "predetermined temperature range" in the present invention) which is a threshold value for the occurrence of cracks in the catalyst carrier 3, even at the time of low temperature in which the carrier internal temperature difference ΔT tends to enlarge, in comparison with the case of the conventional technology.

Moreover, as can be seen by a comparison made between the lower row of FIG. 9A and the lower row of FIG. 9B, too, the extent of the enlargement of the carrier internal temperature difference ΔT will decrease as the EHC temperature in the early stage of acceleration becomes higher. Accordingly, the value of the integrated intake air amount upper limit is set to be higher (larger) in accordance with the rising EHC temperature in the early stage of acceleration, whereby it becomes possible to reduce the decrease of the engine output (restraint amount) of the internal combustion engine 10. Thus, in this manner, the correlation between the EHC temperature and the integrated intake air amount upper limit is reflected in the control map shown in FIG. 6. Accordingly, according to this output suppression control, even if the threshold value for the occurrence of cracks is set to a value ΔT2 which is lower than the above-mentioned value ΔT1, it becomes possible to maintain the carrier internal temperature difference ΔT to be equal to or less than the value ΔT2, as well as to reduce the extent of the suppression of the output of the internal combustion engine 10.

<Modification>

Here, note that the above-mentioned embodiment, reference has been made to the invention for avoiding the occurrence of cracks in the EHC 1 in the internal combustion engine 10 mounted on the hybrid vehicle 100, but the present invention can be applied to the internal combustion engine 10 in a vehicle which is driven only by the internal combustion engine 10, i.e., in a vehicle which does not use, as a source of power, a motor which is driven by means of electric power. Further, the present invention can be applied to a case where the internal combustion engine 10 is a compression self-ignition internal combustion engine.

In addition, in the above-mentioned output suppression control, in cases where a judgment is made in step S111 that a predetermined period of time has passed, this control is ended, but in that case, the setting of the integrated intake air amount upper limit is no longer carried out, so there is a fear that an upper limit of the output power which can be produced by the internal combustion engine 10 may vary rapidly. Accordingly, a sudden change in the output power of the internal combustion engine 10 may be avoided by increasing the value of the integrated intake air amount upper limit in a gradual manner so as to eventually arrive at a state where there is substantially no upper limit, instead of stopping the setting of the integrated intake air amount upper limit immediately after the lapse of the predetermined period of time. In addition, there is necessarily no need to carry out this adjustment of gradually changing the value of the integrated intake air amount upper limit after waiting for the judgment on the lapse of the predetermined period of time in step S111, and according to the carrier internal temperature difference ΔT, the adjustment processing may be started at a timing earlier to some extent than a point in time at which the predetermined period of time has passed, within a range in which the possibility of the occurrence of cracks does not increase. Here, note that the gradual change of the amount of intake air according to the adjustment appears in the change over time of the amount of intake air in a suppression return period of FIG. 8(b).

Second Embodiment

Figure 10:
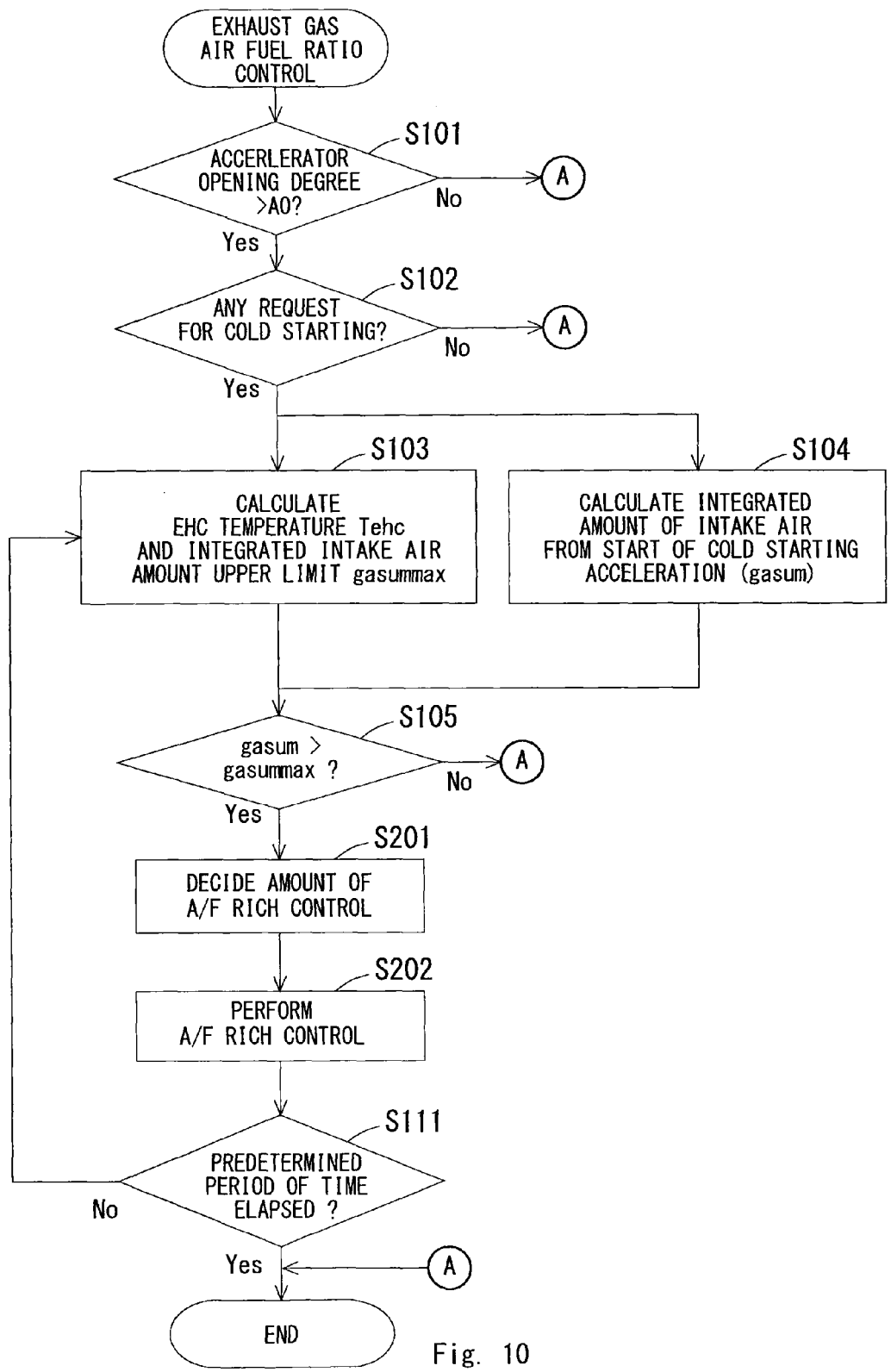
FIG. 10 is a second flow chart with respect to the control for suppressing enlargement of the carrier internal temperature difference of the electrically heated catalyst, which is carried out by the control apparatus for an internal combustion engine according to an embodiment of the present invention.

Reference will be made to a second embodiment of a control apparatus for the internal combustion engine 10 according to the present invention, based on FIG. 10 through FIG. 15. FIG. 10 is a flow chart of exhaust gas air fuel ratio control for suppressing the occurrence of cracks in the EHC 1, wherein among individual processings which constitute this control, the substantially same processings as those which constitute the output suppression control shown in FIG. 5 are attached by the same reference numerals, and the detailed explanation thereof is omitted. Specifically, the exhaust gas air fuel ratio control shown in FIG. 10 is such that the processings in steps S106 through S110 in the output suppression control shown in FIG. 5 are replaced by those in steps S201 and S202. Accordingly, when an affirmative determination is carried out in step S105, processings of steps S201 and S202 are carried out, and thereafter the control process arrives at step S111.

Specifically, in step S201, in order to eliminate an excessive amount of input energy to the EHC 1 with which a crack can be produced due to the carrier internal temperature difference ΔT resulting from a difference between the integrated amount of intake air gasumm and the integrated intake air amount upper limit gasummmax, an amount of control to shift the air fuel ratio of the exhaust gas from the internal combustion engine 1 to a rich side (i.e., an amount of control with respect to the air fuel ratio of the exhaust gas which serves to cause the air fuel ratio to shift from a stoichiometric air fuel ratio to a rich side air fuel ratio, and which is hereinafter referred to as an "amount of rich control") is decided. Because the internal combustion engine 10 is a spark ignition internal combustion engine (gasoline engine), in order to optimize the combustion efficiency thereof, the combustion condition thereof is ordinarily controlled so as to make the air fuel ratio of the exhaust gas to be an air fuel ratio in the vicinity of the stoichiometric air fuel ratio. In this description, this ordinary combustion control is referred to as ordinary stoichiometric control, from the point of view of the air fuel ratio of the exhaust gas. In this stoichiometric control, the temperature of the exhaust gas basically becomes relatively high as a result of the optimization of the combustion efficiency, and hence, the energy of the exhaust gas flowing into the EHC 1 will also be in a state of high energy. The present invention focuses on that the exhaust gas being subjected to stoichiometric control is generally in a state of having high energy in this manner, and so, in step S201, in order to decrease the energy possessed by the exhaust gas, the combustion condition in the internal combustion engine 10 is regulated so as to shift the air fuel ratio of the exhaust gas to the rich side, i.e., the above-mentioned amount of rich control is decided.

Figure 11:
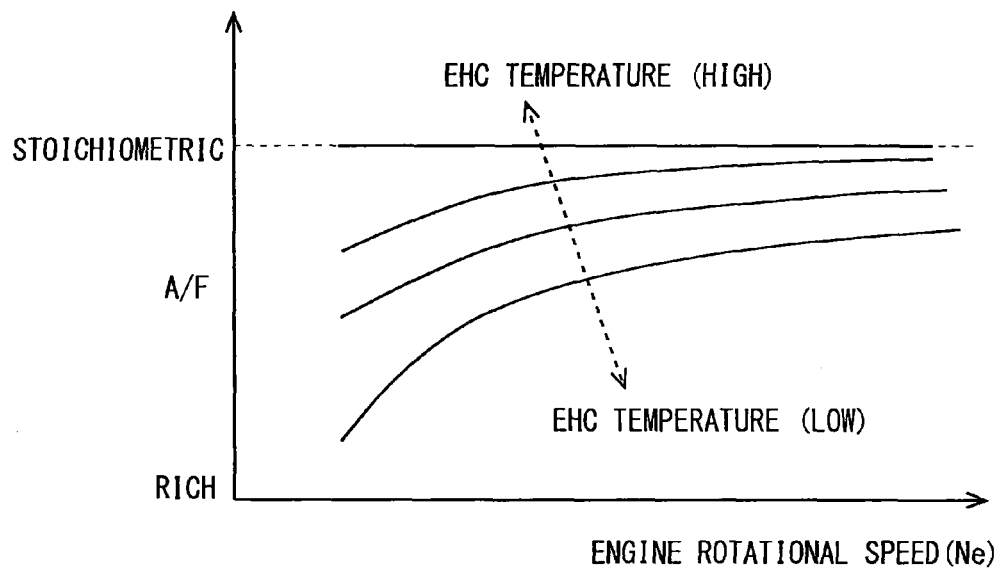
FIG. 11 is a first view showing a correlation between the engine rotational speed and the temperature of the electrically heated catalyst for deciding an air fuel ratio of the exhaust gas in a control flow shown in FIG. 10.
Figure 12:
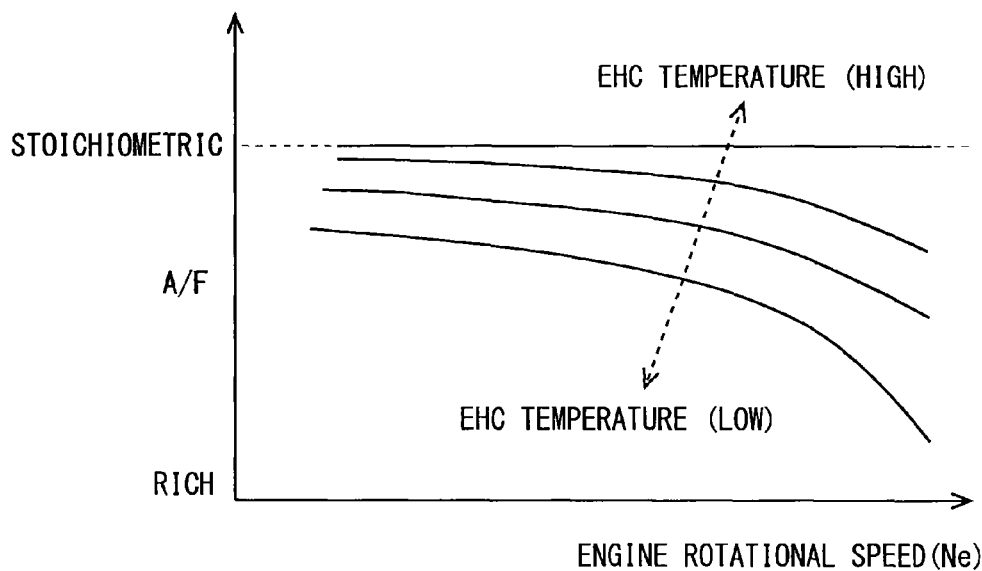
FIG. 12 is a second view showing a correlation between the engine rotational speed and the temperature of the electrically heated catalyst for deciding the air fuel ratio of the exhaust gas in the control flow shown in FIG. 10.
Figure 13:
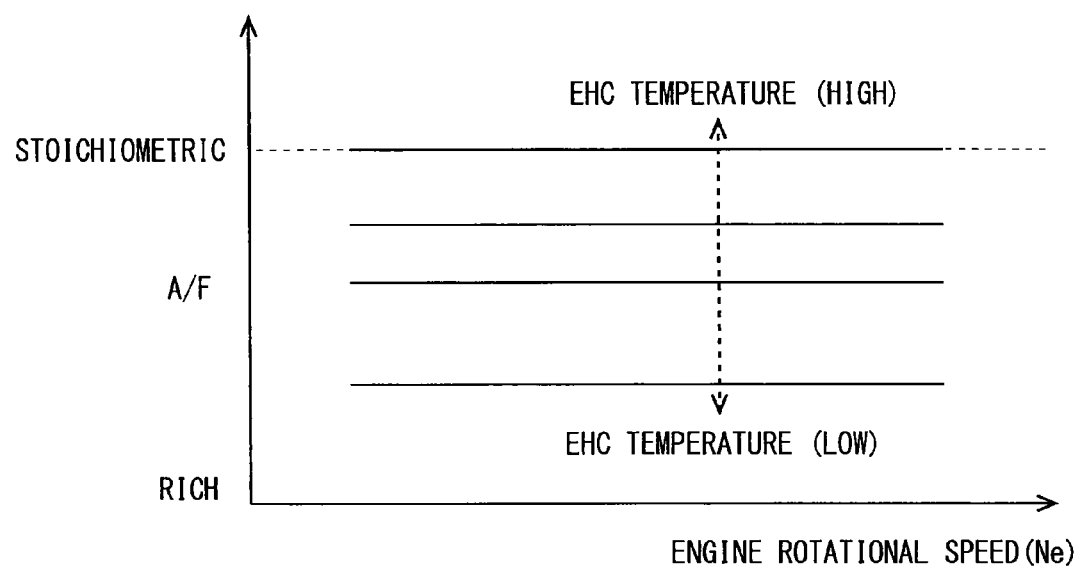
FIG. 13 is a third view showing a correlation between the engine rotational speed and the temperature of the electrically heated catalyst for deciding the air fuel ratio of the exhaust gas in the control flow shown in FIG. 10.

Here, reference will be made to a specific decision method for the amount of rich control based on FIG. 11 through FIG. 13. FIG. 11 through FIG. 13 show control maps each of which defines a correlation between the engine rotational speed and the air fuel ratio of the exhaust gas, wherein an axis of abscissa represents the engine rotational speed of the internal combustion engine 10, and an axis of ordinate represents the air fuel ratio of the exhaust gas. In addition, this correlation is defined at each given EHC temperature, and according to these maps, the air fuel ratio of the exhaust gas for suppressing the input energy to the EHC 1, in other words, the above-mentioned amount of rich control, can be calculated based on the engine rotational speed of the internal combustion engine 10 and the EHC temperature of the EUC 1. Here, note that the higher the EHC temperature, the more difficult to enlarge the carrier internal temperature difference ΔT becomes, as mentioned above, and hence, in these control maps, the above-mentioned correlation at each given EHC temperature is set in such a manner that the correlation of the air fuel ratio of the exhaust gas with respect to the engine rotational speed shifts to the richer side, in other words, the amount of rich control increases, in the case of the EHC temperature being low, in comparison with the case of the EHC temperature being high.

In this embodiment, the amount of rich control may be decided according to any of the control maps shown in FIG. 11 through FIG. 13. Here, the characteristic features of the control maps as shown in the individual figures will be explained in the following.

<Control Map Shown in FIG. 11>

In this control map, the correlation between the engine rotational speed and the air fuel ratio of the exhaust gas has been set in such a manner that the amount of rich control becomes larger in accordance with the earlier stage of acceleration in which the engine rotational speed of the internal combustion engine is low, and the amount of rich control becomes smaller in accordance with the higher engine rotational speed. If the amount of rich control is decided according to this control map, enrichment of the air fuel ratio of the exhaust gas will be strongly carried out at the time of low temperature in which a crack tends to occur in the EHC 1, i.e., in the early stage of acceleration immediately after the cold starting of the internal combustion engine 10, as a result of which it is possible to avoid the carrier internal temperature difference from enlarging in an efficient manner, while suppressing the total sum of the amount of rich control in an entire period of acceleration (a period from the early stage of acceleration to the end of acceleration). On the other hand, the enrichment of the air fuel ratio of the exhaust gas is always strongly carried out in the early stage of acceleration in which the engine rotational speed is low, so that in cases where acceleration is stopped during the course thereof, excessive rich control will be carried out.

<Control Map Shown in FIG. 12>

This control map shown in FIG. 12 sets a correlation between the engine rotational speed and the air fuel ratio of the exhaust gas, which is opposite to that in the control map shown in FIG. 11, and specifically, the amount of rich control becomes larger in accordance with the later period of acceleration in which the engine rotational speed of the internal combustion engine is high, and the amount of rich control becomes smaller in accordance with the lower engine rotational speed. Accordingly, if the amount of rich control is decided according to this control map, it will be possible to avoid the excessive rich control from being carried out, in cases where acceleration is stopped in the course of acceleration, but there is a tendency that the total sum of the amount of rich control in the entire period of acceleration increases.

<Control Map Shown in FIG. 13>

This control map shown in FIG. 13 sets a correlation between the engine rotational speed and the air fuel ratio of the exhaust gas, which is considered to be intermediate between the control map shown in FIG. 11 and the control map shown in FIG. 12, and specifically, the amount of rich control is constant irrespective of the engine rotational speed of the internal combustion engine, but the amount of rich control changes according to the EHC temperature. Accordingly, if the amount of rich control is decided according to this control map, there will be obtained a tendency with respect to the amount of rich control, which is regarded as intermediate between a case according to the control map shown in FIG. 11 and a case according to the control map shown in FIG. 12.

In this manner, in step S201, based on the characteristic features according to the individual control maps, the amount of rich control can be suitably decided according to any of the control maps in FIG. 11 through FIG. 13. After the step S201 is completed or ended, the control flow goes to step S202, where the air fuel ratio of the exhaust gas is made to shift to the rich side, so that the input energy to the EHC 1 should be suppressed based on the amount of rich control decided in step S201. In this embodiment, an amount of fuel to be injected in the internal combustion engine 10 is regulated, thereby making it possible to achieve an intended rich side air fuel ratio of the exhaust gas. After the processing of the step S202 is ended, the control flow goes to step S111, where the above-mentioned determination processing is carried out.

When this exhaust gas air fuel ratio control is carried out in this manner, in cases where the actual integrated amount of intake air has exceeded the integrated intake air amount upper limit according to the various parameters including the EHC temperature Tehc and so on, at the time of the cold starting of the internal combustion engine 10, the rich control of the air fuel ratio of the exhaust gas is carried out so that the carrier internal temperature difference ΔT in the catalyst carrier 3 does not enlarge to an excessive extent, as a result of which the energy supplied to the EHC 1 through the exhaust gas is suppressed. Here, note that in this control, the suppression of the input energy to the EHC 1 is attained without limiting the amount of intake air, unlike the output suppression control according to the first embodiment, and hence, the output of the internal combustion engine 10 is not limited. However, the fuel consumption may be increased by means of the rich control which is carried out by increasing the amount of fuel injection according to this control.

Here, reference will be made to the effect or advantage of the control apparatus according to the above-mentioned invention, based on FIG. 14, FIG. 15A, FIG. 15B, and FIG. 15C. First, (a) of FIG. 14 (hereinafter FIG. 14(a)) shows the change over time of the integrated amount of intake air at the time of the exhaust gas air fuel ratio control shown in FIG. 10 being carried out, and (b) of FIG. 14 (hereinafter FIG. 14(b)) shows by way of example the change over time of the air fuel ratio of the exhaust gas from the internal combustion engine 10, i.e., the air fuel ratio of the exhaust gas flowing into the EHC. Here, note that the change over time of the setting of the integrated intake air amount upper limit in FIG. 14(a) is related to the setting of the integrated intake air amount upper limit gasummax calculated based on the control map shown in FIG. 6 in step S103, wherein the change over time at the time of WOT acceleration is related to the actual amount of intake air in the internal combustion engine 10 at the time of carrying out WOT acceleration (full throttle acceleration) as an example of acceleration at the time of cold starting.

Figure 14:
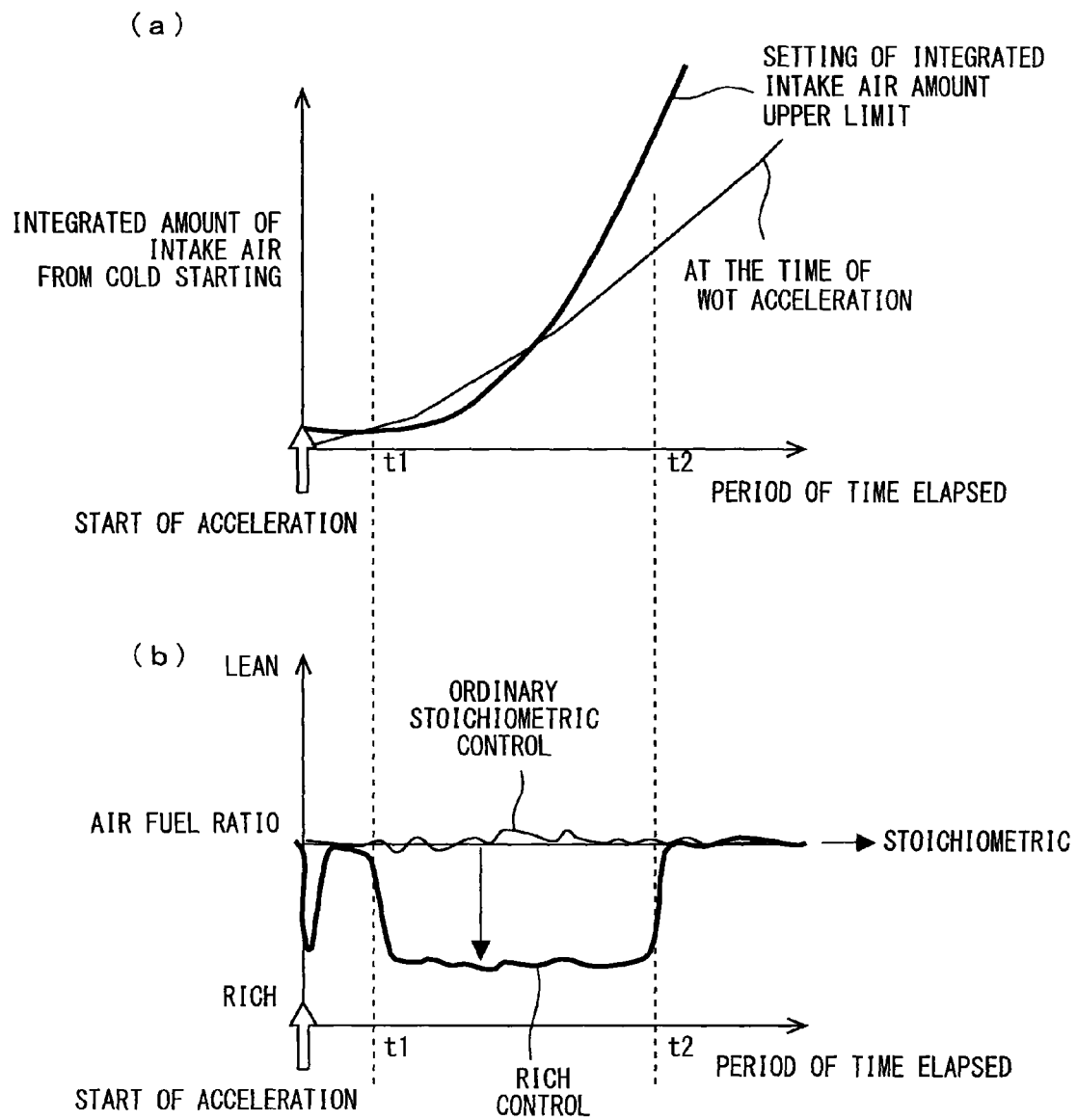
FIG. 14 is a view showing the integration Ga from the cold starting and the change over time of the air fuel ratio of the exhaust gas, when the control flow shown in FIG. 10 is carried out.

Then, in the example shown in FIG. 14, it means that the actual amount of intake air has exceeded the integrated intake air amount upper limit gasummax after the lapse of a period of time t1 from the start of WOT acceleration at the time of cold starting, and accordingly, processings of steps S201, S202 in the exhaust gas air fuel ratio control will be carried out from this point in time onward. Explaining the change over time of the air fuel ratio of the exhaust gas at this time based on FIG. 14(b), immediately after the start of WOT acceleration, the amount of fuel injection is temporarily increased in order to respond to the starting of the WOT acceleration so that the air fuel ratio of the exhaust gas shifts to the rich side, but after that, the above-mentioned ordinary stoichiometric control is carried out so as to control the air fuel ratio of the exhaust gas to be a value in the vicinity of the stoichiometric air fuel ratio. Then, when the period of time t1 has passed, the air fuel ratio of the exhaust gas is controlled to the rich side by means of the rich control according to the above-mentioned processings in steps S201, S202. This rich control is carried out in order to suppress the input energy supplied to the EHC 1 by the exhaust gas, as referred to above. Thereafter, when the predetermined period of time has passed in step S111 (i.e., when a period of time t2 has passed in which it is judged that the possibility of the occurrence of cracks in the EHC 1 is low), the above-mentioned exhaust gas air fuel ratio control is ended, and it shifts to the control of the air fuel ratio of the exhaust gas according to the ordinary stoichiometric control.

Figure 15A:
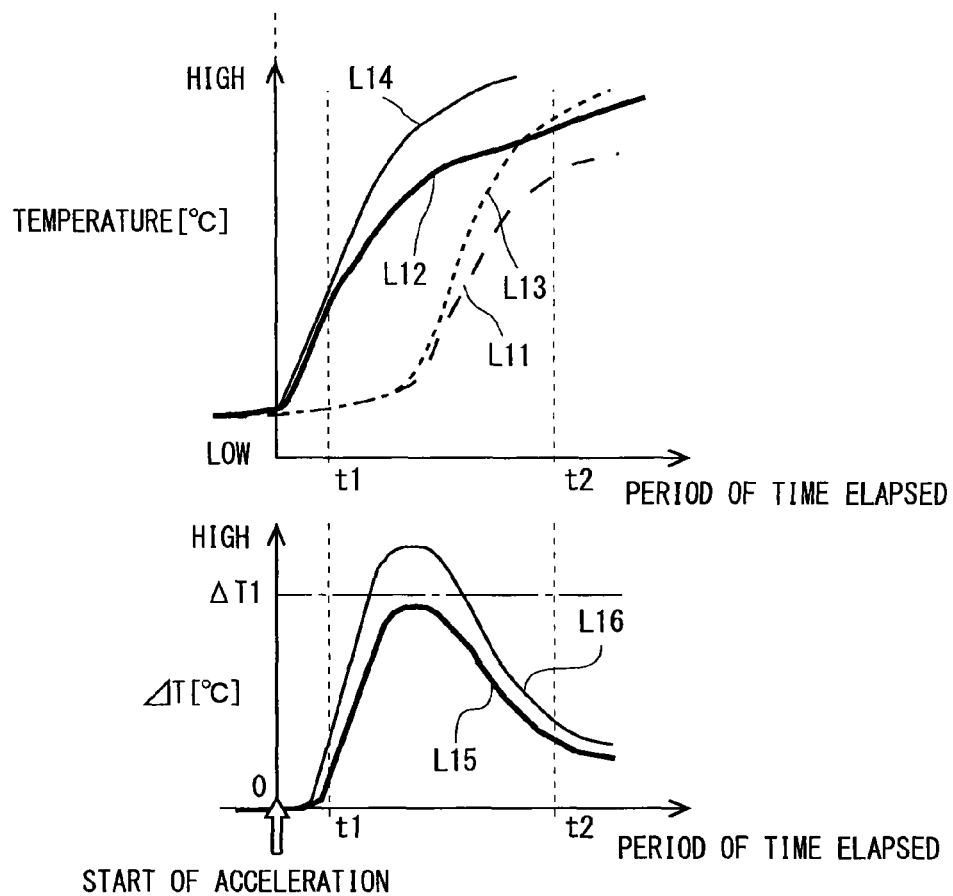
FIG. 15A is a view showing the change over time of the temperature of each portion of the electrically heated catalyst and the change over time of the carrier internal temperature difference when the control flow shown in FIG. 10 is carried out.
Figure 15B:
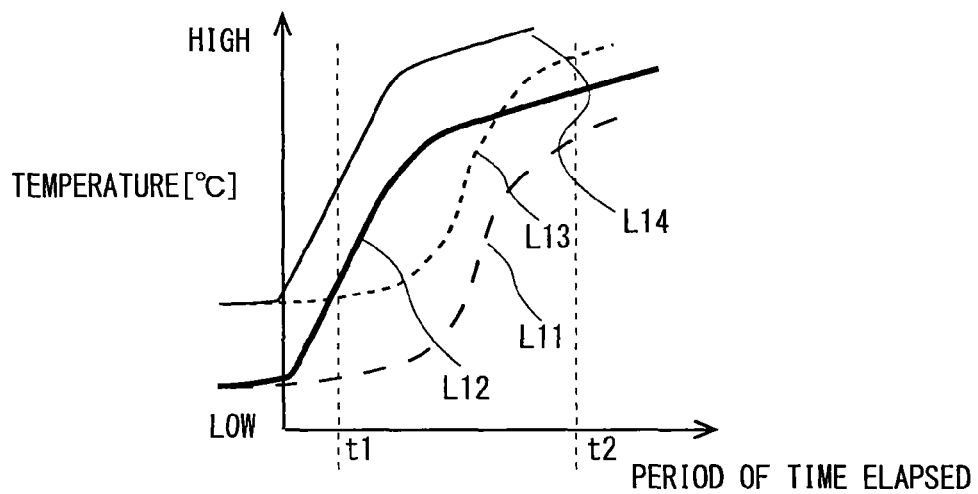
FIG. 15B is a view showing the change over time of the temperature of each portion of the electrically heated catalyst when the control flow shown in FIG. 10 is carried out.

Next, in an upper part in FIG. 15A and in FIG. 15B, the temperature changes over time of the side wall surface and the near side wall portion of the catalyst carrier 3 are shown in an upper part of each figure, and the change over time of the carrier internal temperature difference ΔT is shown by way of example in a lower part of FIG. 15A. Specifically, in both of the figures, a line L11 indicates the temperature change over time of the side wall surface of the catalyst carrier 3 at the time of the above-mentioned exhaust gas air fuel ratio control being carried out, and a line L12 indicates the temperature change over time of the near side wall portion of the catalyst carrier 3 at the time of the above-mentioned exhaust gas air fuel ratio control being carried out, wherein the carrier internal temperature difference ΔT, which is the difference in temperature between the side wall surface and the near side wall portion related to both of the lines, is indicated by a line L15 in the lower part of FIG. 15A. Similarly, in both of the figures, a line L13 indicates the temperature change over time of the side wall surface of the catalyst carrier 3 in the case of the above-mentioned exhaust gas air fuel ratio control being not carried out, i.e., in the conventional technology, and a line L14 indicates the temperature change overtime of the near side wall portion of the catalyst carrier 3 in the conventional technology, wherein the carrier internal temperature difference ΔT, which is the difference in temperature between the side wall surface and the near side wall portion related to both of the lines, is indicated by a line L16 in the lower part of FIG. 15A.

Figure 15C:
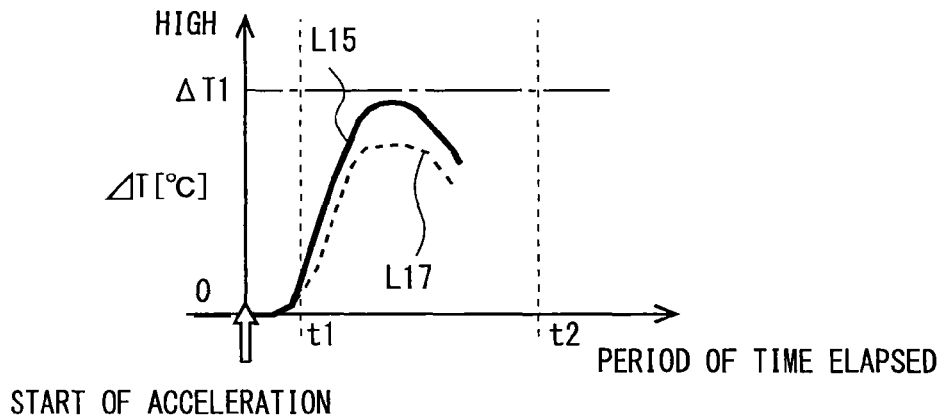
FIG. 15C is a view showing the change over time of the carrier internal temperature difference in each temperature of the electrically heated catalyst when the control flow shown in FIG. 10 is carried out.

In addition, FIG. 15A is a view showing the change over time of each parameter in the case where the EHC temperature is relatively low at an early stage of acceleration in an accelerating state of the internal combustion engine 10 at the time of cold starting thereof, and on the contrary, FIG. 15B is a view showing the change over time of each parameter in the case where the EHC temperature is relatively high at the early stage of acceleration. Then, there is shown in FIG. 15C a comparison between the change over time of the carrier internal temperature difference ΔT at the time of the above-mentioned exhaust gas air fuel ratio control being carried out (i.e., the change over time indicated by the line L15 corresponding to a case where the EHC temperature is low), which is shown in the lower part of FIG. 15A, and the change over time of the carrier internal temperature difference ΔT at the time of the above-mentioned exhaust gas air fuel ratio control being carried out (i.e., the change over time indicated by a line L17 corresponding to a case where the EHC temperature is high), which, though not shown in FIG. 15B, is calculated from the temperature change over time shown in FIG. 15B.

As also seen from these figures, by this exhaust gas air fuel ratio control being carried out, it is possible to maintain the carrier internal temperature difference ΔT equal to or less than a threshold value ΔT1 (i.e., a temperature range equal to or less than this criterion corresponds to a "predetermined temperature range" in the present invention) which is a threshold value for the occurrence of cracks in the catalyst carrier 3, even at the time of low temperature in which the carrier internal temperature difference ΔT tends to enlarge, in comparison with the case of the conventional technology. In addition, as shown by the line L17 in FIG. 15C, the extent of the enlargement of the carrier internal temperature difference ΔT will decrease as the EHC temperature in the early stage of acceleration becomes higher. Accordingly, the amount of rich control decided in step S201, i.e., the extent of the shift of the air fuel ratio from the vicinity of the stoichiometric air fuel ratio to the rich side, may be made smaller as the EHC temperature in the early stage of acceleration becomes higher. By doing in this manner, it is possible to suppress the amount of fuel consumption for the enrichment of the exhaust gas to be carried out for crack suppression.

Third Embodiment

Figure 16:
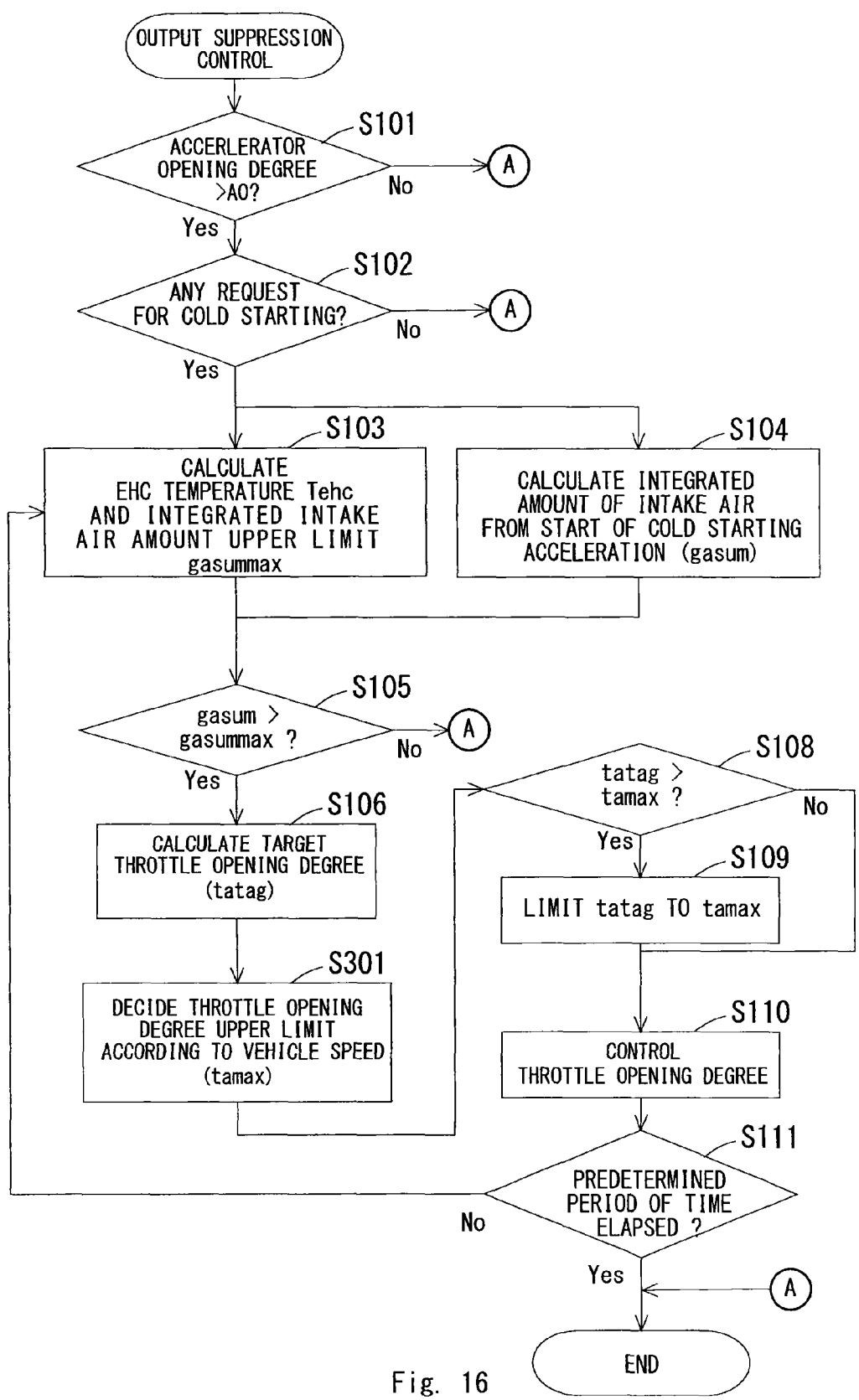
FIG. 16 is a third flow chart with respect to the control for suppressing enlargement of the carrier internal temperature difference of the electrically heated catalyst, which is carried out by the control apparatus for an internal combustion engine according to an embodiment of the present invention.

Reference will be made to a third embodiment of a control apparatus for the internal combustion engine 10 according to the present invention, based on FIG. 16 and FIG. 17. FIG. 16 shows, as a modification of the output suppression control shown in FIG. 5, a flow chart of exhaust gas air fuel ratio control for suppressing the occurrence of cracks in the EHC 1, wherein among individual processings which constitute this control, the substantially same processings as those which constitute the output suppression control shown in FIG. 5 are attached by the same reference numerals, and the detailed explanation thereof is omitted. Specifically, the output suppression control shown in FIG. 16 is such that the processing in step S107 in the output suppression control shown in FIG. 5 is replaced by that in step S301.

Accordingly, the processing of step S301 to be carried out after the processing of step S106 is ended will be explained. In step S301, a throttle opening degree upper limit tamax is decided, as in step S107, but in this embodiment, in making this decision, the travel speed of the hybrid vehicle 100 at the time of this control is taken into consideration, in addition to the engine rotational speed of the internal combustion engine 10 and the integrated intake air amount upper limit gasummax. Accordingly, a method of deciding the throttle opening degree upper limit tamax in step S301 will be explained, based on FIG. 17. In this embodiment, the throttle opening degree upper limit tamax is decided by the use of a control map shown in (a) of FIG. 17 (hereinafter FIG. 17(a)) and a control map shown in (b) of FIG. 17 (hereinafter FIG. 17(b)). The control map shown in FIG. 17(a) is substantially the same as the control map which is shown in FIG. 7 and which corresponds to the processing of step S106, and hence, the detailed explanation thereof is omitted. Then, according to the control map shown in FIG. 17(a), the correlation between the engine rotational speed and the throttle opening degree upper limit tamax is selected based on the integrated intake air amount upper limit gasummax. In this embodiment, there are shown by way of example three correlations according to the integrated intake air amount upper limit gasumumax (i.e., correlations indicated by a line L21, a line L22 and a line L23), and for example, it is assumed that one of the above-mentioned correlations, which is indicated by the line L21, is selected based on the integrated intake air amount upper limit gasummax calculated in step S103.

Further, in this embodiment, the control map (see FIG. 17(b)) is prepared which uses, as a base, the correlation indicated by the selected line L21 with the travel speed of the hybrid vehicle 100 being reflected on the throttle opening degree upper limit tamax. When the travel speed of the hybrid vehicle 100 is high at the time of the cold starting of the internal combustion engine 10 in which this output suppression control is carried out, the amount of intake air taken into the internal combustion engine 10 inevitably becomes large even if the degree of opening of the throttle valve 14 is the same as in the case where the vehicle speed is low, and this may cause an increase in the input energy to the EHC 1 through the exhaust gas. Accordingly, in the control map shown in FIG. 17(b), the correlation between the engine rotational speed and the throttle opening degree upper limit tamax is set in such a manner that the higher the travel speed of the hybrid vehicle 100, the more the amount of intake air is suppressed. Specifically, a correlation indicated by a line L21-1 is set at the time when the vehicle speed EV is 0 km/h, and correlations indicated by lines L21-2 and L21-3 are set at the time when the vehicle speed EV is 50 and 90 km/h, respectively. Here, note that the control map shown in FIG. 17(b) corresponds to the correlation related to the line L21 in FIG. 17(a), but as for the correlations related to the line L22, the line L23 and so on, too, there are of course prepared corresponding control maps in which the vehicle speed is reflected.

Figure 17:
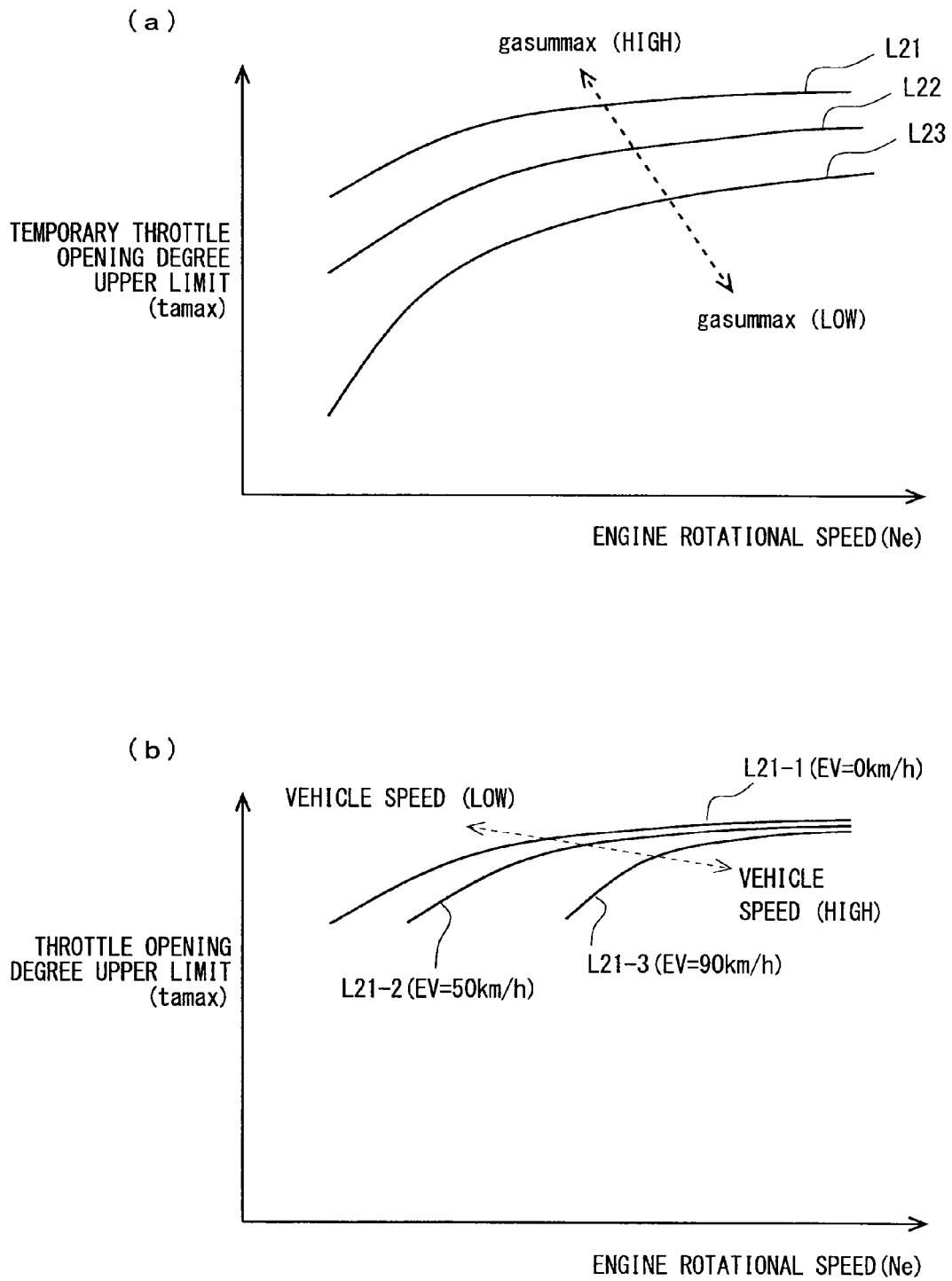
FIG. 17 is a view showing a correlation among the engine rotational speed, the upper limit of integration Ga, and the speed of a vehicle for deciding the upper limit of the throttle opening degree in the control flow shown in FIG. 10.

By using the control maps shown in (a) and (b) of FIG. 17 in this manner, decision processing of the throttle opening degree upper limit tamax in step S301 will be carried out, and after that, processings from step S108 onward will be carried out. In this manner, by the output suppression control shown in FIG. 16 being carried out, at the time of the cold starting of the internal combustion engine 10, the integrated amount of intake air will be controlled according to the various parameters such as the EHC temperature Tehc, etc., so as not to exceed the limiting value for preventing the carrier internal temperature difference $\Delta T$ in the catalyst carrier 3 from being enlarged to an excessive extent. In particular, with the vehicle speed at the time of control being reflected on the upper limit value of the integrated amount of intake air, it is possible to avoid the enlargement of the carrier internal temperature difference $\Delta T$ in an appropriate and adequate manner, in the cold starting of the internal combustion engine 10 from a soak state thereof, too.

Fourth Embodiment

Figure 18:
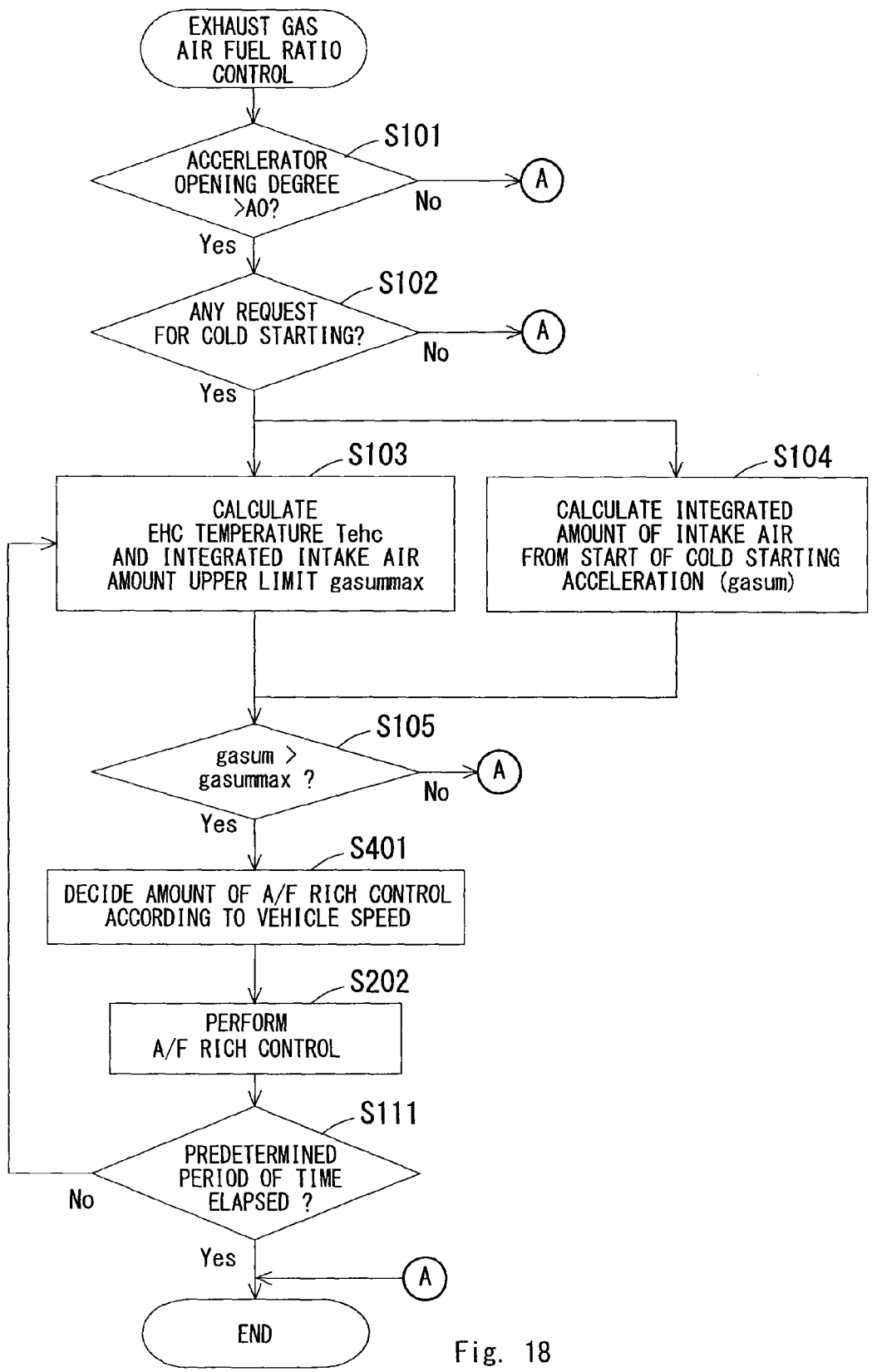
FIG. 18 is a fourth flow chart with respect to the control for suppressing enlargement of the carrier internal temperature difference of the electrically heated catalyst, which is carried out by the control apparatus for an internal combustion engine according to an embodiment of the present invention.

Reference will be made to a fourth embodiment of a control apparatus for the internal combustion engine 10 according to the present invention, based on FIG. 18 and FIG. 19. FIG. 18 shows, as a modification of the exhaust gas air fuel ratio control shown in FIG. 10, a flow chart of exhaust gas air fuel ratio control for suppressing the occurrence of cracks in the EHC 1, wherein among individual processings which constitute this control, the substantially same processings as those which constitute the exhaust gas air fuel ratio control shown in FIG. 10 are attached by the same reference numerals, and the detailed explanation thereof is omitted. Specifically, the exhaust gas air fuel ratio control shown in FIG. 18 is such that the processing in step S201 in the exhaust gas air fuel ratio control shown in FIG. 10 is replaced by that in step S401.

Accordingly, the processing of step S401 to be carried out after an affirmative determination is made in step S105 will be explained. In step S401, an amount of rich control for the air fuel ratio of the exhaust gas is decided, as in step S201, but in this embodiment, in making this decision, the travel speed of the hybrid vehicle 100 at the time of this control is taken into consideration, in addition to the engine rotational speed of the internal combustion engine 10 and the EHC temperature. Accordingly, a method of deciding the amount of rich control in step S401 will be explained, based on FIG. 19. In this embodiment, the amount of rich control is decided by the use of a control map shown in (a) of FIG. 19 (hereinafter FIG. 19(a)) and a control map shown in (b) of FIG. 19 (hereinafter FIG. 19(b)). The control map shown in FIG. 19(a) is substantially the same as the control map which is shown in FIG. 12 and which corresponds to the processing of step S201, and hence, the detailed explanation thereof is omitted. Then, according to the control map shown in FIG. 19(a), a correlation between the engine rotational speed and the air fuel ratio of the exhaust gas is selected based on the EHC temperature. In this embodiment, there are shown by way of example four correlations according to the EHC temperature (i.e., correlations indicated by a line L31, a line L32, a line L33, and a line L34), and for example, it is assumed that one of the above-mentioned correlations, which is indicated by the line L32, is selected based on the EHC temperature.

Next, in this embodiment, the control map (see FIG. 19(b)) is prepared which uses, as a base, the correlation indicated by the selected line L32 with the travel speed of the hybrid vehicle 100 being reflected on the amount of rich control. When the travel speed of the hybrid vehicle 100 is high at the time of the cold starting of the internal combustion engine 10 in which this exhaust gas air fuel ratio control is carried out, the amount of intake air taken into the internal combustion engine 10 inevitably becomes large even if the degree of opening of the throttle valve 14 is the same as in the case where the vehicle speed is low, and this may cause an increase in the input energy to the EHC 1 through the exhaust gas. Accordingly, in the control map shown in FIG. 19(b), the correlation between the engine rotational speed and the air fuel ratio of the exhaust gas is set in such a manner that the higher the travel speed of the hybrid vehicle 100, the more the air fuel ratio of the exhaust gas is made to shift to the rich side. Specifically, a correlation indicated by a line L32-1 is set at the time when the vehicle speed EV is 0 km/h, and correlations indicated by lines L32-2 and L32-3 are set at the time when the vehicle speed EV is 50 and 90 km/h, respectively. Here, note that the control map shown in FIG. 19(b) corresponds to the correlation related to the line L32 in FIG. 19(a), but as for the correlations related to the line L33, the line L34 and so on, too, there are of course prepared corresponding control maps in which the vehicle speed is reflected.

Figure 19:
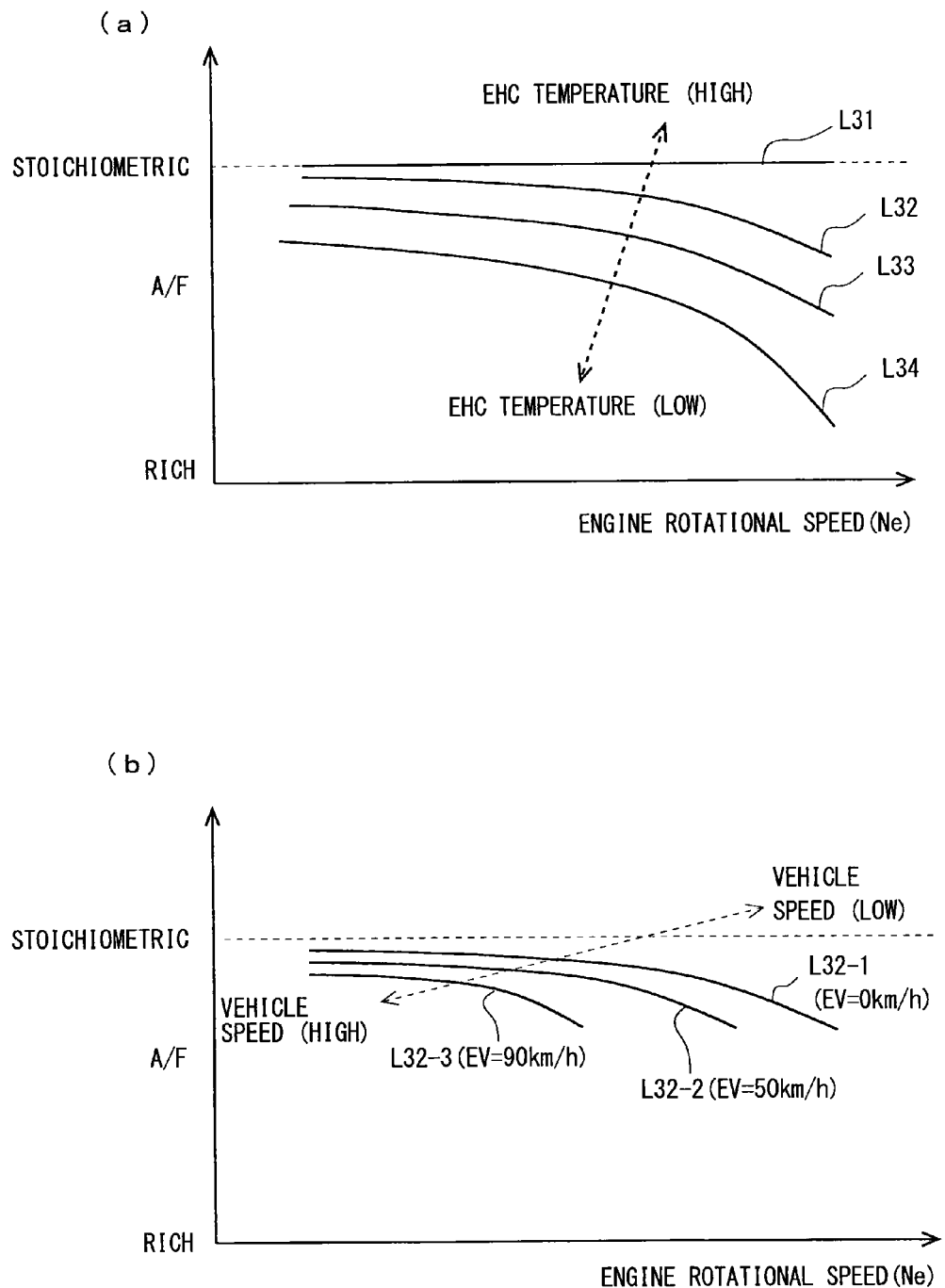
FIG. 19 is a view showing a correlation among the engine rotational speed, the temperature of the electrically heated catalyst and the vehicle speed for deciding the air fuel ratio of the exhaust gas in a control flow shown in FIG. 18.

By using the control maps shown in (a) and (b) of FIG. 19 in this manner, decision processing of the amount of rich control in step S401 will be carried out, and after that, processings from step S202 onward will be carried out. In this manner, with this exhaust gas air fuel ratio control shown in FIG. 18 being carried out, at the time of the cold starting of the internal combustion engine 10, the air fuel ratio of the exhaust gas will be controlled according to the various parameters such as the EHC temperature Tehc, etc., so as not to enlarge the carrier internal temperature difference $\Delta T$ in the catalyst carrier 3 to an excessive extent. In particular, with the vehicle speed at the time of control being reflected on the amount of rich control, it is possible to avoid the enlargement of the carrier internal temperature difference $\Delta T$ in an appropriate and adequate manner, in the cold starting of the internal combustion engine 10 from a soak state thereof, too.

Fifth Embodiment

Figure 20:
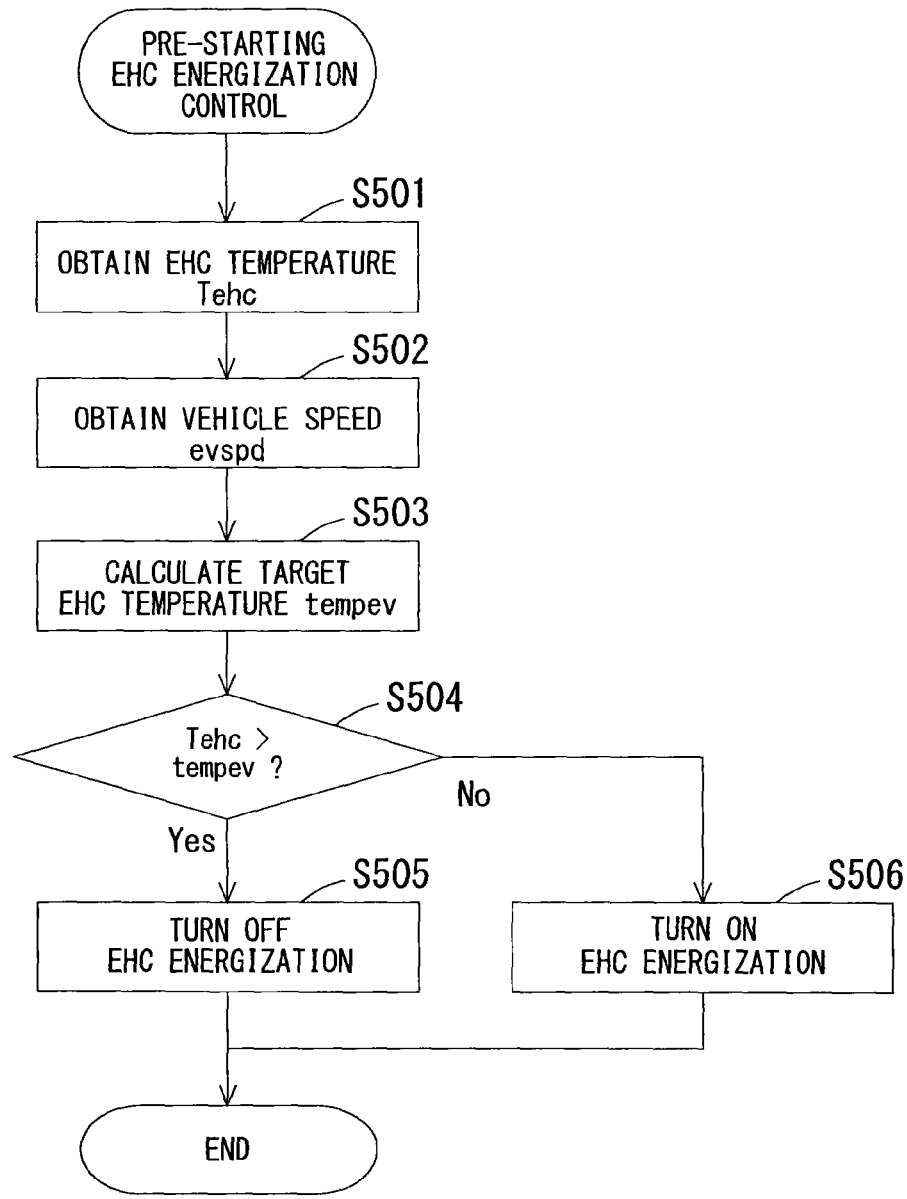
FIG. 20 is a fifth flow chart with respect to the control for suppressing enlargement of the carrier internal temperature difference of the electrically heated catalyst, which is carried out by the control apparatus for an internal combustion engine according to an embodiment of the present invention.

Reference will be made to a fifth embodiment of a control apparatus for the internal combustion engine 10 according to the present invention, based on FIG. 20 and FIG. 21. FIG. 20 is a flow chart for control in which electric power is supplied to the EHC 1 in advance before the cold starting of the internal combustion engine 10 so as to raise the EHC temperature, whereby when energy is inputted or supplied through the exhaust gas at the time of subsequent cold starting, the carrier internal temperature difference $\Delta T$ in the catalyst carrier 3 is not enlarged to an excessive extent, and this control is referred to as pre-starting EHC energization control. This control is carried out repeatedly as required in a state where the internal combustion engine 10 is stopped, by means of the ECU 20.

First, in step S501, the EHC temperature Tehc is obtained. As for the estimation or calculation of the EHC temperature, it is carried out based on the temperature of the exhaust gas detected by the temperature sensor 6a, etc., as shown in the above-mentioned embodiments. Thereafter, in step S502, the travel speed of the hybrid vehicle 100 evspd is obtained based on the value detected by the crank position sensor 11. After the processing of the step S502 is ended, the control flow goes to step S503.

In step S503, a target EHC temperature tempev is calculated which is a target temperature at the time of raising the temperature of the EHC 1 by electrically energizing the EHC 1 in advance in a state where the internal combustion engine 10 is stopped, i.e., in a state before the cold starting of the internal combustion engine 10 is carried out. This target EHC temperature tempev is set in order to raise the EHC temperature in advance at a point in time when the exhaust gas flows into the EHC, so that even if the internal combustion engine 10 is cold started, the carrier internal temperature difference $\Delta T$, which is a cause for the occurrence of cracks, will not be enlarged to an excessive extent due to the exhaust gas flowing into the EHC 1. The higher the EHC temperature immediately after the cold starting of the internal combustion engine 10, the more difficult it becomes for the carrier internal temperature difference $\Delta T$ to be enlarged, as shown in the above-mentioned embodiments (e.g., FIG. 9B and FIG. 15B).

Figure 21:
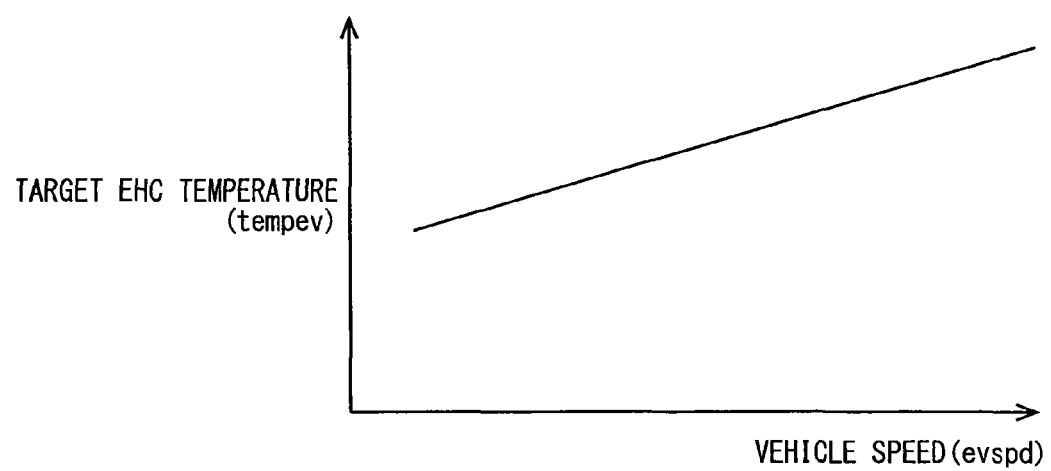
FIG. 21 is a view showing a correlation between a target temperature of the electrically heated catalyst (EHC) and the vehicle speed for deciding the target EHC temperature in a control flow shown in FIG. 20.

Accordingly, as for the calculation of the target EHC temperature tempev, it is carried out according to a control map shown in FIG. 21. This control map, in which an axis of abscissa represents the vehicle speed evspd and an axis of ordinate represents the target EHC temperature tempev, defines a correlation between both of them. In this relative relation, it is set in such a manner that the higher the vehicle speed evspd, the higher the target EHC temperature tempev also becomes. This is because the enlargement of the carrier internal temperature difference $\Delta T$ is intended to be suppressed by setting higher the target EHC temperature, in consideration of the fact that in cases where the internal combustion engine 10 is cold started when the higher the vehicle speed evspd is, the larger the amount of intake air taken into the internal combustion engine 10 becomes, as a result of which a larger amount of energy will be supplied to the EHC 1 through the exhaust gas, and the carrier internal temperature difference $\Delta T$ will be enlarged too much. From the above, in step S503, the target EHC temperature tempev is calculated based on the vehicle speed evspd obtained in step S502, according to the control map shown in FIG. 21. After the processing of the step S503 is ended, the control flow goes to step S504.

In step S504, it is determined whether the EHC temperature Tehc obtained in step S501 is larger than the target EHC temperature tempev calculated in step S503. Then, when an affirmative determination is made in step S504, the electrical energization to the EHC 1 is not carried out (the processing of step S505), but on the other hand, when a negative determination is made, electrical energization to the EHC 1 is carried out so that the EHC temperature can reach the target EHC temperature tempev (the processing of step S506).

When this pre-starting EHC energization control is carried out in this manner, in the state where the internal combustion engine 10 is stopped, the EHC temperature is controlled based on the travel speed of the hybrid vehicle 100, so that it becomes a temperature which does not excessively enlarge the carrier internal temperature difference $\Delta T$ which is a cause for the occurrence of cracks. For that reason, even if the internal combustion engine 10 is thereafter cold started during traveling of the hybrid vehicle 100, it is possible to suppress the occurrence of cracks due to the exhaust gas flowing into the EHC 1.

DESCRIPTION OF THE REFERENCE SIGNS

1 . . . EHC (electrically heated catalyst)
2 . . . exhaust passage
3 . . . catalyst carrier
4 . . . case
5 . . . mat
7 . . . electrodes
10 . . . internal combustion engine
12 . . . intake passage
13 . . . air flow meter
14 . . . throttle valve
20 . . . ECU
21a, 21b . . . motors (motor-generators)
30 . . . battery
100 . . . hybrid vehicle

The invention claimed is:

1. A control apparatus for an internal combustion engine comprising:
an electrically heated catalyst that is arranged in an exhaust passage of the internal combustion engine, and heats a catalyst having an ability to purify an exhaust gas by heat from a heat generation element which generates heat by supply of electric power, said heat generation element being a structure which supports said catalyst;
an electronic controller including circuitry, the electronic controller decides a restraint amount of energy inputted to said electrically heated catalyst by the exhaust gas flowing through the electrically heated catalyst so that a heat generation element internal temperature difference, which is a difference in temperature between predetermined portions in said heat generation element of said electrically heated catalyst at the time of cold starting of said internal combustion engine and at a period of time elapsed from the cold starting, falls within a predetermined temperature range; and
said electronic controller that controls an operating state of said internal combustion engine according to the restraint amount for said input energy, wherein
said internal combustion engine is mounted on a hybrid vehicle which uses, as a source of power, said internal combustion engine and a motor driven by electric power supplied from an electric power supply; and
said electronic controller increases the restraint amount for the energy inputted to said electrically heated catalyst in accordance with the increasing travel speed of said hybrid vehicle at the time of the cold starting of said internal combustion engine.

2. The control apparatus for an internal combustion engine as set forth in claim 1, wherein
based on the period of time elapsed from the cold starting of said internal combustion engine, said electronic controller calculates, as the restraint amount for said input energy, an upper limit integrated value which is an upper limit value of an integrated value of a predetermined parameter related to an amount of the exhaust gas flowing through said electrically heated catalyst, in order for said heat generation element internal temperature difference to fall within said predetermined temperature range; and said electronic controller controls engine output power of said internal combustion engine in such a manner that an actual value of said predetermined parameter integrated from the cold starting of said internal combustion engine does not exceed said upper limit integrated value, or becomes close to said upper limit integrated value.

3. The control apparatus for an internal combustion engine as set forth in claim 2, wherein said predetermined parameter is an amount of intake air in said internal combustion engine.

4. The control apparatus for an internal combustion engine as set forth in claim 1, wherein based on a period of time elapsed from the cold starting of said internal combustion engine, said electronic controller calculates, as the restraint amount for said input energy, an upper limit integrated value which is an upper limit value of an integrated value of a predetermined parameter related to an amount of the exhaust gas flowing through said electrically heated catalyst, in order for said heat generation element internal temperature difference to fall within said predetermined temperature range; and said electronic controller controls the temperature of the exhaust gas by regulating an air fuel ratio of the exhaust gas due to the combustion of fuel in said internal combustion engine, in such a manner that an actual value of said predetermined parameter integrated from the cold starting of said internal combustion engine does not exceed said upper limit integrated value, or becomes close to said upper limit integrated value.

5. The control apparatus for an internal combustion engine as set forth in claim 4, wherein said internal combustion engine is a spark ignition internal combustion engine; and said electronic controller may regulate a condition of combustion in said internal combustion engine in such a manner that the air fuel ratio of the exhaust gas becomes richer as the actual integrated value of said predetermined parameter becomes larger, thereby making the temperature of the exhaust gas lower.

6. The control apparatus for an internal combustion engine as set forth in claim 1, further comprising:

said electronic controller that estimates or detects a temperature of said electrically heated catalyst;

wherein said electronic controller reduces the restraint amount for the energy inputted through the exhaust gas to the electrically heated catalyst in accordance with the rising temperature of said electrically heated.

7. The control apparatus for an internal combustion engine as set forth in claim 1, wherein the control of the operating state of said internal combustion engine according to the restraint amount for said input energy by means of said electronic controller is carried out in a predetermined period of acceleration immediately after the cold starting of said internal combustion engine.

\* \* \* \* \*